United States Patent
Nahum et al.

(10) Patent No.: US 7,088,441 B2
(45) Date of Patent: Aug. 8, 2006

(54) METHOD AND APPARATUS FOR MEASURING WAVELENGTH CHANGES IN A HIGH-RESOLUTION MEASUREMENT SYSTEM

(75) Inventors: Michael Nahum, Kirkland, WA (US); Joseph D. Tobiason, Woodinville, WA (US); Kim W. Atherton, Kirkland, WA (US)

(73) Assignee: Mitutoyo Corporation, Kawasaki (JP)

( * ) Notice: Subject to any disclaimer, the term of this patent is extended or adjusted under 35 U.S.C. 154(b) by 194 days.

(21) Appl. No.: 10/251,449

(22) Filed: Sep. 19, 2002

(65) Prior Publication Data

US 2004/0057041 A1   Mar. 25, 2004

(51) Int. Cl.
*G01J 1/42* (2006.01)
(52) U.S. Cl. .................. 356/222; 356/416; 250/226; 372/32
(58) Field of Classification Search .............. 356/222, 356/300, 326, 328, 319, 416, 419, 519; 250/226; 372/32
See application file for complete search history.

(56) References Cited

U.S. PATENT DOCUMENTS

| | | | |
|---|---|---|---|
| 4,308,456 A | 12/1981 | Van Der Gaag et al. | |
| 5,627,648 A | 5/1997 | Garrett | |
| 5,646,399 A | 7/1997 | Fukushima et al. | |
| 5,729,347 A | 3/1998 | So | |
| 6,046,813 A * | 4/2000 | Naganuma | 356/416 |
| 6,134,253 A * | 10/2000 | Munks et al. | 372/32 |
| 6,226,116 B1 | 5/2001 | Dowe et al. | |
| 6,275,320 B1 | 8/2001 | Dhuler et al. | |
| 6,313,937 B1 | 11/2001 | Dowe et al. | |
| 6,768,096 B1 * | 7/2004 | Hammond et al. | 250/226 |

FOREIGN PATENT DOCUMENTS

| | | | | |
|---|---|---|---|---|
| EP | 0 818 859 A1 | 1/1998 | EP | |
| 0 911 621 | | A2 | 4/1999 | |

* cited by examiner

OTHER PUBLICATIONS

"MEMS Development Platform, Optical Shutter Array," *Coventer Inc.*, Cary, North Carolina, as early as Mar. 2002, <http://www.coventor.com/media/optical_shutter.pdf>[retrieved Apr. 18, 2004].

*Primary Examiner*—Gregory J. Toatley, Jr.
*Assistant Examiner*—Juan D. Valentin, II
(74) *Attorney, Agent, or Firm*—Christensen O'Connor Johnson Kindness PLLC

(57) ABSTRACT

A method and apparatus for measuring a wavelength-related characteristic of a radiation source is provided. Two beams travel through substantially identical filters at different angles, which produces two different output signals that behave similarly with respect to power and/or temperature variations. In various embodiments, the two beams are filtered through two portions of a single filter. A diffraction grating may be mounted to the filter to split incident radiation into first and second beams. The beams thus travel through the filter at different angles, to produce two output signals that can be combined to compensate for common-mode errors as well as power variations. Extremely small size and high-resolution may be achieved. Single or multiple detectors may also be used. Filter temperature sensitivities may also be compensated based on a direct temperature measurement or based on outputs derived from two additional beams through filters with a different temperature dependency from the filters used for the first two beams. Alternatively, the angle at which a beam travels through a filter may be physically adjusted to compensate for temperature change.

22 Claims, 8 Drawing Sheets

METHOD AND APPARATUS FOR MEASURING WAVELENGTH CHANGES IN A HIGH-RESOLUTION MEASUREMENT SYSTEM

FIELD OF THE INVENTION

The invention relates to a sensing device, and, more particularly, to a method and apparatus for measuring values related to the wavelength and/or frequency of a radiation source. The invention is particularly suitable for monitoring sources used in high-resolution measurement systems such as high-resolution interferometric encoders and the like.

BACKGROUND OF THE INVENTION

Certain measurement applications require measuring the wavelength or frequency, or related shifts, of a radiation source to very high levels of resolution over a relatively small wavelength range. Examples include high resolution interferometric type encoders, various non-contact profilometer sensors, applications in the telecom industry, as well as general laboratory applications. In addition, for many applications, the measurement must be conducted within a small space and at a low cost. Several methods are commonly used for wavelength measurement, including spectrometers, interferometers, and transmission through optical filters.

FIG. 1A shows a simple measurement system 10 for measuring wavelength shift using an optical bandpass filter. The measurement system 10 includes an input incident beam 12, a bandpass filter 14, a filtered beam 16, and a power detector 18. The input incident beam 12 is filtered by the filter 14 to produce the filtered beam 16. In this application a bandpass filter is not strictly required, as any optical element having a non-negligible wavelength transmission dependence can be used. The power of the filtered beam 16 is detected by the power detector 18.

FIG. 1B shows the transmission spectrum for the bandpass filter 14. The filter 14 is characterized by a central wavelength $\lambda_0$, as well as its full width half maximum (FWHM) wavelength $\Delta\lambda$. A point P is shown on the filter curve 20 at a wavelength X1 and a transmission level Y1. It can be seen that the point P is located on the steep part of the filter curve 20, and that slight changes in the wavelength can thus be sensed by measuring the change in the transmitted power, as is done by the power detector 18 of FIG. 1A. In this manner, once the filter curve 20 is established, the measurement system 10 of FIGS. 1A and 1B provides a simple configuration for determining a wavelength shift based on a transmitted power or intensity.

FIG. 2 illustrates a measurement system 30 which offers certain improvements over the measurement system 10 of FIG. 1A. As shown in FIG. 2, the measurement system 30 includes a beam splitter 34, a filter 38, and power detectors 42 and 46. An input incident beam 32 is split into two beams 36 and 44 by the beam splitter 34. The beam 36 is filtered by the filter 38 to produce the filtered beam 40. The power of the filtered beam 40 is detected by the power detector 42. The power of the beam 44 is detected by the power detector 46. By utilizing the outputs of the power detectors 42 and 46 to compute a ratio of filtered to non-filtered beam powers, deviations in the incident power are nominally eliminated as error sources. In other words, in contrast to the measurement system 10 of FIG. 1A which was unable to differentiate between wavelength shifts and power source fluctuations, the measurement system 30 of FIG. 2 uses a power ratio signal which is insensitive to deviations in the incident power, and thus more reliably discriminates wavelength shifts.

FIG. 3A illustrates a measurement system 50 which provides an alternative configuration for measuring wavelength shifts. Similar to the measurement system 30, the measurement system 50 utilizes the ratio between two power detectors to eliminate the incident power dependence to the first order. The measurement system 50 includes a beam splitter 54, filters 58 and 66, and power detectors 62 and 70. An incident input beam 52 is split into beams 56 and 64 by the beam splitter 54. The beam 56 is filtered by the filter 58 to produce a filtered beam 60. The power of the filtered beam 60 is detected by the power detector 62. The beam 64 is filtered by the filter 66 to produce a filtered beam 68. The power of the filtered beam 68 is detected by the power detector 70.

FIG. 3B illustrates two filter curves 80 and 82 which correspond to the filters 58 and 66, respectively. As shown in FIG. 3B, the filter curve 82 overlaps with the filter curve 80. In other words, the transmission spectrum of the filter 66 overlaps with the transmission spectrum of the filter 58. A point P1 is shown on the filter curve 80 at a wavelength X1 and a transmission power Y2, and a point P2 is shown on the filter curve 82 at the wavelength X1 and at a transmission power Y1. It will be appreciated that for wavelengths increasing from wavelength X1, that the transmission power on filter curve 80 is decreasing, while the transmission power on filter curve 82 is increasing. Thus, the ratio between a transmission power Y1 corresponding to the filter 66, and a transmission power Y2 corresponding to the filter 58 is unique for a particular wavelength over the wavelength transmission spectrum that is shared by the filter 58 and the filter 66. By utilizing the outputs of the power detectors 62 and 70 to compute a ratio of filtered beam powers, deviations in the incident power may be largely eliminated.

One prior art patent illustrating one of the prior art measurement systems is U.S. Pat. No. 4,308,456. The '456 patent describes a system utilizing two filters and two photodiodes, where the output of the first filter decreases with increasing wavelength, and the output of the second filter increases with increasing wavelength in a substantially linear manner over a bandwidth of 575–590 nm. In one embodiment, a beam splitter is utilized to split the incident beam into two beams, which are then each sent through a respective filter to a respective power detector. The ratio of the first and second outputs is taken and compared with predetermined values corresponding to preselected known frequencies for providing an output corresponding to the frequency of the light. The purpose of the invention is stated to be to provide an accurate measurement of the color of the light.

Another prior patent illustrating one of the prior art measurement systems is U.S. Pat. No. 5,729,347. The '347 patent teaches using a ratio between the filter output and a control signal. In one embodiment, an optical coupler is utilized to divide an incident beam into two beams, one of which is further divided by another opto-coupler into another two beams, for a total of three beams. The two beams divided by the second opto-coupler are each sent through respective filters, and are then processed by an amplifier and an A-to-D converter. The other beam is not filtered, but is also processed by an amplifier and an A-to-D converter. In the processing, the two digital values from the two filtered beams are evaluated, and one of the values is selected for further use. Then, a transmission ratio with respect to the non-filtered beam is computed, and a corresponding wavelength is output to a display. This provides a measurement system with a measurement of a wavelength in a relatively small predetermined range. The '347 patent also teaches forming a high resolution spectrometer by taking transmission ratio readings continuously while rotating the filter at progressive angles and performing suitable signal processing on the results to determine the spectrum of the incoming signal.

The present invention is directed to a method and apparatus that provides an improved wavelength measurement system. More specifically, the present invention is directed to a measurement system with a highly integrated structure that substantially reduces wavelength measurement or discrimination errors due to environmental variations. In addition, the present invention achieves these objectives in a compact and low cost configuration.

SUMMARY OF THE INVENTION

While the above prior art systems illustrate various ways to measure wavelengths, they also all have certain drawbacks. For example, all of the above prior art systems have unacceptably high sensitivity to temperature variations and other environmental effects for many practical applications, and particularly for applications in high precision instruments. It should be appreciated that in various exemplary applications and embodiments according to this invention, it is useful to discriminate wavelength changes on the order of one part per million. It should be appreciated that small mechanical misalignments, distortions and thermal disturbances that are inherently different for each signal path of the prior art systems can create errors which are unacceptable in such applications and embodiments. Furthermore, there is a need to further reduce the size and cost of wavelength measuring systems before they are usable in a number of practical applications.

A method and apparatus for measuring wavelength changes in a high resolution measurement system is provided. In accordance with one aspect of the invention, two or more beams may be filtered differently by directing the beams through substantially identical filter structures, and preferably by directing the beams through the same filter structure, along paths having differing filtering characteristics. The use of a single filter structure to filter multiple beams provides distinct advantages over prior art systems which required multiple filters to filter multiple beams. One particular advantage relates to overcoming the difficulties encountered when attempting to compensate for power or temperature fluctuations in systems which utilize a different filter for each beam.

In accordance with another aspect of the invention, a diffraction grating provides multiple beams. The grating may split an incident input beam into first and second beams. The beams thus travel through the filter at different angles, which allows the single filter to be used to produce two different output values that can be used to compensate for power and/or temperature variations.

In accordance with yet another aspect of the invention, a second diffraction grating may be utilized so as to diffract one of the beams to converge towards the same detector that detects the other beam. A shutter may further be used to allow the system to switch between the two beams. Alternatively, the shutter can be used to simply modulate one of the beams. In an alternate embodiment, rather than utilizing a shutter and a single detector, different detectors may be utilized for detecting the different beams.

In accordance with still another aspect of the invention, a first grating may be utilized to split an incident beam into first and second beams, while a second diffraction grating is utilized to split the first beam into first and third beams, and the second beam into second and fourth beams. A first filter with low temperature dependence may be utilized to filter the first and third beams, while a second filter with large temperature dependence may be utilized to filter the second and fourth beams. An array of photo detectors may be utilized to detect each of the first, second, third, and fourth beams. The four outputs of this embodiment can be utilized to derive signals by which the two unknown values of power fluctuations and temperature changes can be effectively compensated.

In accordance with yet another aspect of the invention, a beam deflector that is temperature sensitive is provided for one or more beams. The beam deflector may alter the angle at which a beam enters the filter as a function of temperature.

In accordance with still another aspect of the invention, a diffraction grating may split an incident input beam into first, second and third beams. The first two beams travel through the filter at different angles, which allows the single filter to be used to produce two different output values that can be used to compensate for power variations. The third beam passes through a beam deflector, which alters the angle that the beam enters the filter as a function of temperature. In combination with an output signal from the first and/or second beam, the output related to the third beam of this embodiment can be utilized to derive signals that can be used to effectively compensate the effects of temperature changes.

In accordance with yet another aspect of the invention, respective beam deflectors that are temperature sensitive are provided for each of at least two beams. In one embodiment, each temperature sensitive beam deflector adjusts the angle at which the respective beam enters the filter as a function of temperature. In various exemplary embodiments, the deflector provides a temperature sensitive adjustment of the angle that cancels the effects of an inherent temperature sensitivity of the filter in the output arising from the respective beam, to make the apparatus for measuring wavelength changes substantially insensitive to temperature variations.

It will be appreciated that the present invention provides for an ultra miniature configuration that utilizes substantially or completely identical filter structures and differing beam paths to differently filter two or more beams, so as to substantially reduce wavelength measurement errors. Furthermore, various configurations are usable to compensate for both power fluctuations and temperature changes.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 4:
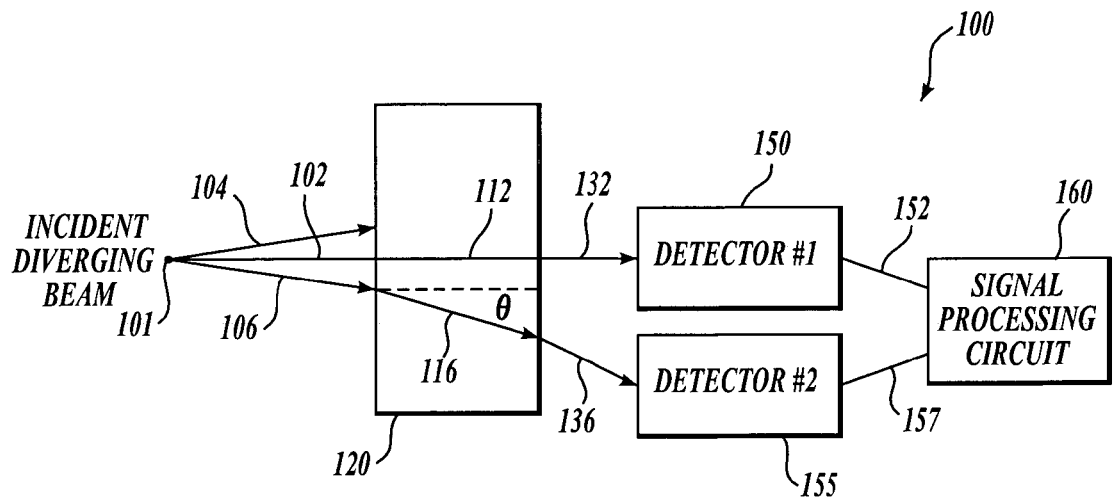
FIG. 4 is a block diagram of a measurement system including a filter structure and utilizing a diverging incident beam and two detectors for measuring the wavelength shift of a radiation source in accordance with the present invention.

FIG. 4 illustrates a measurement system 100 that is formed in accordance with the present invention. The measurement system 100 includes a diverging radiation/light source, a filter structure 120, detectors 150 and 155, and a signal processing circuit 160.

From a point 101, an incident diverging beam diverges into an incident beam 102 and incident angled beams 104 and 106. The incident beam 102 passes through the filter structure 120 as a beam 112 and emerges as a filtered beam 132, which is provided to the detector 150. The incident angled beam 106 passes through the filter structure 120 as an angled beam 116, and emerges as an angled filtered beam 136, which is provided to the detector 155. The angled beam 116 passes through the filter structure 120 at an angle θ with respect to the direction normal to the surface of the filter structure 120. Accordingly, the angled beam 116 is filtered differently than the beam 112, and the angled filtered beam 136 therefore provides a different signal than the filtered beam 132, as described in detail below. The detectors 150 and 155 output respective filter signals on lines 152 and 157, respectively, to the signal processing circuit 160. In one embodiment, each detector 150 and 155 will integrate over a range of angles, e.g., θ+δθ, depending on the size of the detector. In various other embodiments, various other apertures or optical elements, not shown, are arranged to limit the beams received by each respective detector to a narrow angular range.

In another exemplary embodiment, the detectors 150 and 155 are provided, in effect, by a one-dimensional or two-dimensional detector array that spans an entire range of diverging beam paths having respective angles of incidence. Signals from two respective sets of one or more elements of the detector array that span a limited sub-range corresponding to a selected nominal angle are combined (if necessary) and output on the respective signal lines 152 and 157 for signal processing, as described further below.

In yet another exemplary embodiment, a one-dimensional or two-dimensional detector array provides more than two effective detector outputs, each output corresponding to a different effective beam path having a respective angle of incidence. The signal processing circuit 160 receives output signals from each detector element of the one-dimensional or two-dimensional detector array. The signal processing circuit 160 then analyzes the spatial distribution of intensities across the array to determine the wavelength of the incident beam 101, for example, by comparison to a lookup table. The lookup table may be constructed experimentally by inputting various known source wavelengths and storing the corresponding intensity distributions. It will be appreciated that such a one-dimensional or two-dimensional detector array may be similarly used to provide two or more detector outputs in the various other measurement system embodiments described below. It will be further appreciated that such embodiments using a one-dimensional or two-dimensional detector array may be less sensitive to various beam alignments and actually give better measurement resolution and accuracy, although in some cases at the expense of more complex signal processing and longer signal processing times.

It can be seen that the configuration of measurement system 100 allows the use of a single filter structure in place of the two separate filters used in certain prior art systems. The use of a single filter is made possible by the fact that the incident beam 102 and the incident angled beam 106 pass through the filter structure 120 at different angles to provide a different filter path for each respective beam, and thus provide multiple respective filter signals according to this invention.

In one embodiment, the filter structure 120 is a dielectric Fabrey-Perot filter. One vendor that commercially provides such filters is Melles-Griot. Such filters can provide a desired dependence of the filter characteristic on the angle of incidence θ of the input beam relative to the direction normal to the filter surface. When the filter is characterized by a central wavelength $\lambda_0$ of maximum transmission, the dependence is given by the following expression (valid in at least one embodiment for θ from 0° to 20°):

$$\lambda_\theta = \lambda_0 \left[ 1 - \left(\frac{Ne}{N^*}\right)^2 \sin^2\theta \right]^{\frac{1}{2}} \qquad \text{(Eq. 1)}$$

Where:
$\lambda_\theta$=Peak central wavelength at angle of incidence
$\lambda_0$=Peak central wavelength at normal incidence
Ne=Refractive index of external medium
N*=Effective refractive index of the filter
θ=Angle of incidence The angle θ can be chosen to shift in the central wavelength $\lambda_0$ a desired amount such that it becomes possible to obtain two overlapping transmission curves, as described in detail below with reference to FIGS. 6 and 7.

Figure 1A:
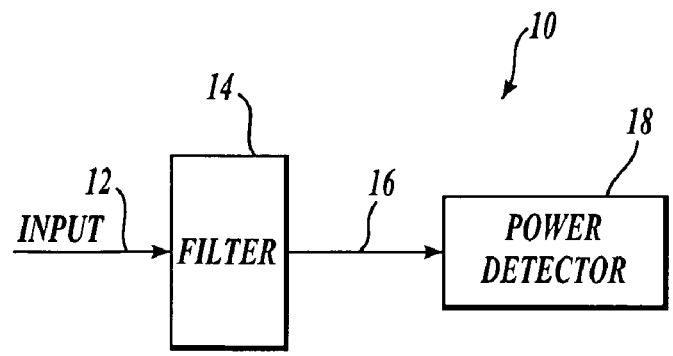
FIG. 1A is a block diagram of a prior art system including a bandpass filter for measuring the wavelength shift of a radiation source.
Figure 1B:
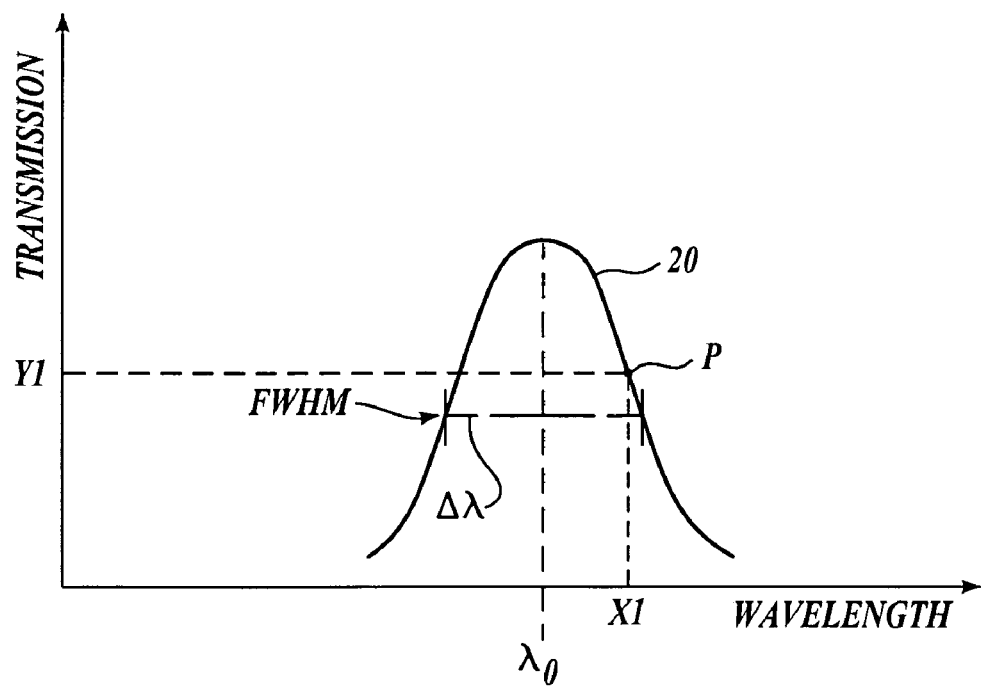
FIG. 1B shows the transmission spectrum for the bandpass filter of FIG. 1A.
Figure 2:
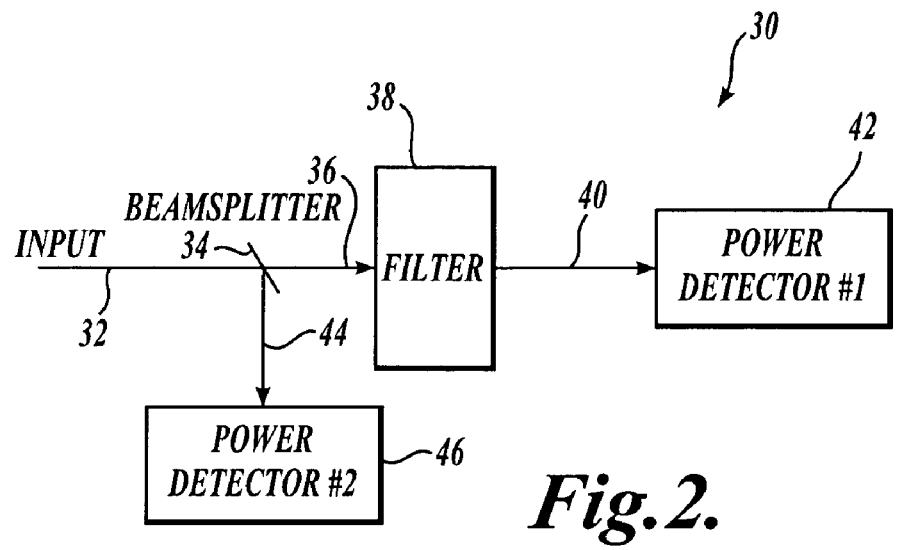
FIG. 2 is a block diagram of a second prior art system with a bandpass filter for measuring the wavelength shift of a radiation source.
Figure 3A:
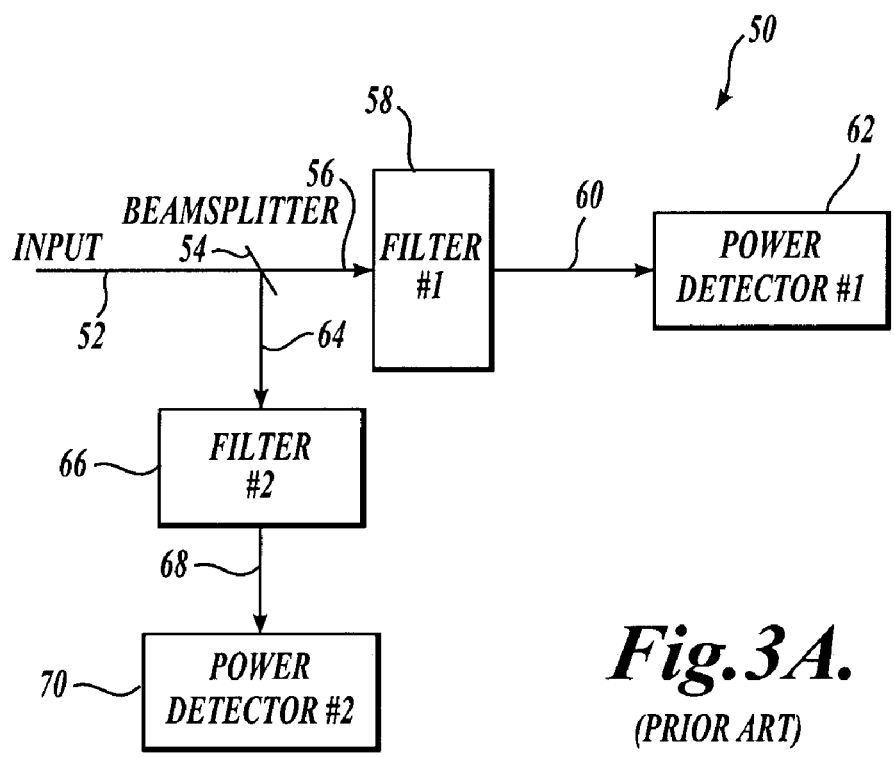
FIG. 3A is a block diagram of a third prior art system with two bandpass filters for measuring the wavelength shift of a radiation source.
Figure 3B:
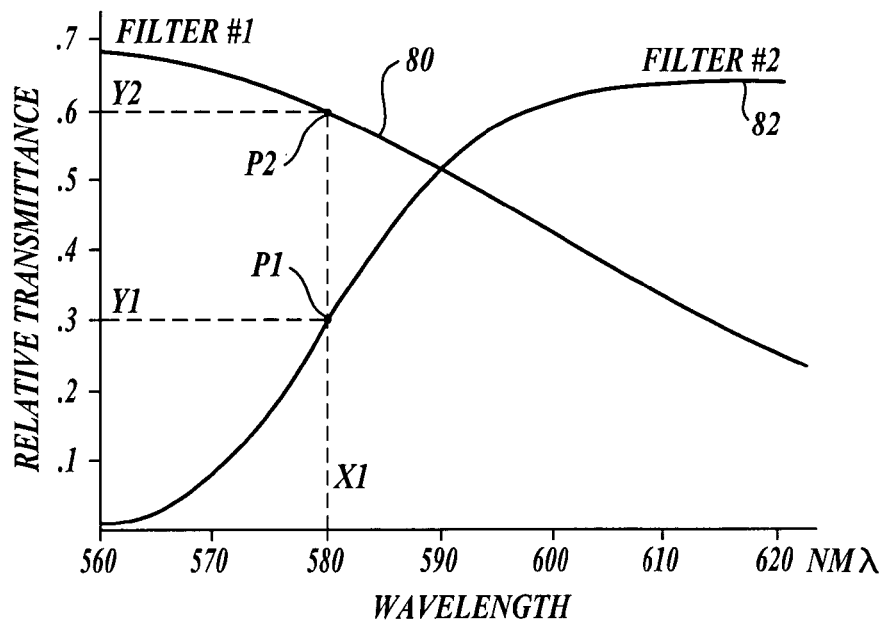
FIG. 3B shows the transmission spectrums for the two bandpass filters of FIG. 3A.

It should be appreciated that in contrast to the prior art overlapping transmission curves shown in prior art FIG. 3B, overlapping transmission curves according to the principles of this invention arise from directing a plurality of beams through substantially identical filter structures, and preferably from directing a plurality of beams through the same filter structure. This has a number of advantages, especially for applications that must precisely discriminate small wavelength changes under changing environmental conditions, and especially for applications requiring low cost and compact size, as described further below.

In one embodiment, in order to achieve ppm levels of resolution in determining changes in a source wavelength, a ratio based on the respective filter signals arising from the overlapping transmission curves is determined by the signal processing circuit 160 to a resolution of approximately 1 part in 1000, and a lookup table or other conversion method is utilized to convert the ratio to the associated source wavelength or to determine a change in the source wavelength relative to a reference or initial source wavelength. Ratio-determining equations which are suitable for various exemplary embodiments are discussed in greater detail below. It will be appreciated that the measurement system 100 provides for an ultra-miniature configuration that utilizes only one filter structure. In various exemplary embodiments, with signal processing according to this invention, as described further below, such configurations substantially reduce wavelength measurement errors not only due to power variations, but also, in particular, due to variations in environmental conditions, potential mechanical and thermal distortions, and errors due to temperature changes of the filter. This provides a substantial improvement over prior art methods that utilize discrete filter and detector components, which consequently have individual residual sensitivities to temperature variations and other environmental effects that therefore cannot be compensated to high accuracy in a practical system design, as well as higher parts cost and additional complexity in the measuring system design.

Figure 5:
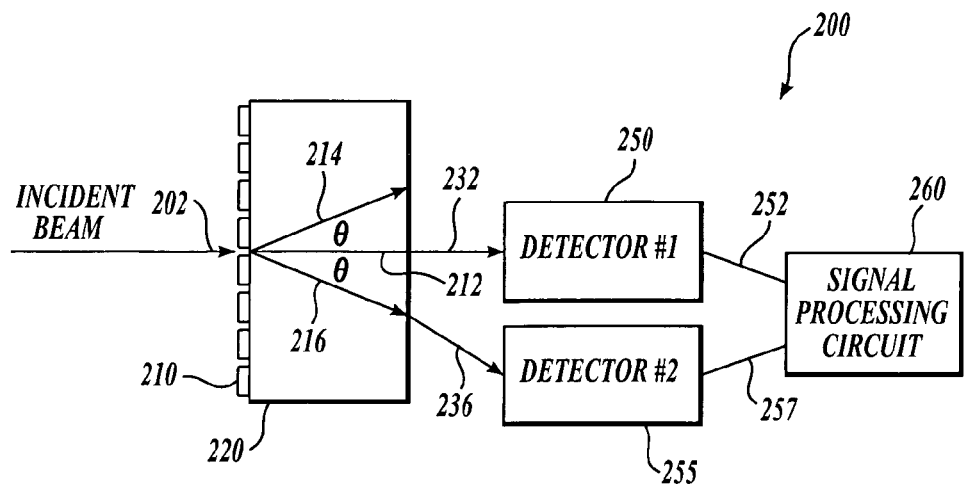
FIG. 5 is a block diagram of an alternate embodiment of a measurement system with a filter structure and a grating and two detectors for measuring a wavelength shift of a radiation source in accordance with the present invention.

FIG. 5 shows a measurement system 200 that illustrates an alternate embodiment of the present invention. The measurement system 200 differs from the measurement system 100 of FIG. 4, in that the measurement system 200 includes a grating to provide multiple beam paths through the filter structure and is more power-efficient and potentially less sensitive to minor component and source alignment variations than the measurement system 100. More specifically, as shown in FIG. 5, the measurement system 200 includes a grating 210 which acts as a beam deflecting element, a filter structure 220, detectors 250 and 255, and a signal processing circuit 260.

An incident input beam 202 is split by the grating 210 into a transmitted beam 212, and +/− first order angled beams 214 and 216. It should be appreciated that it is also possible, in various exemplary embodiments, to design the grating 210 as a blazed grating, so as to diffract in only the $0^{th}$ and +1 order, thus eliminating the beam 214, which improves the power transfer efficiency. It should also be appreciated that in various other embodiments, any other suitable now known or later developed beam deflecting element may be used in place of the grating 210. In one exemplary embodiment, a prism or wedge that intercepts approximately one-half of the incident beam 202 may be used in place of the grating 210. However, such a configuration using a prism will have a greater tendency to produce measurement errors in response to changes in the position of the incident beam 202 relative to the prism, since the beam position determines the proportion of the beam intercepted by the prism to create beam 216. It will be appreciated that embodiments using the grating 210 are generally insensitive to minor variations in the beam position relative to the grating and are, therefore, preferred.

The transmitted beam 212 and the first order angled beam 216 pass through the filter structure 220 to become filtered beam 232 and angled filtered beam 236, respectively, to provide two filter signals from different filter paths according to the principles of this invention. The filtered beam 232 is received by the detector 250, while the angled filtered beam 236 is received by the detector 255. The detector 250 and the detector 255 provide outputs 252 and 257, respectively, to the signal processing circuit 260. It will be appreciated that the measurement system 200 provides similar advantages to those of the measurement system 100 of FIG. 4, including the use of a single filter structure which, as described above, provides distinct advantage over the above-described prior art systems that utilize a different filter for each beam. Specifically, the temperature sensitivities of the filter characteristics of each radiation path through the single filter structure are approximately identical, or proportional to the radiation path length, or at least highly correlated. Consequently residual filter sensitivities along each radiation path due to temperature variations and other environmental effects can be reliably compensated to high accuracy in a practical system design. In addition, the parts cost and complexity of the measuring system design is reduced.

Figure 6:
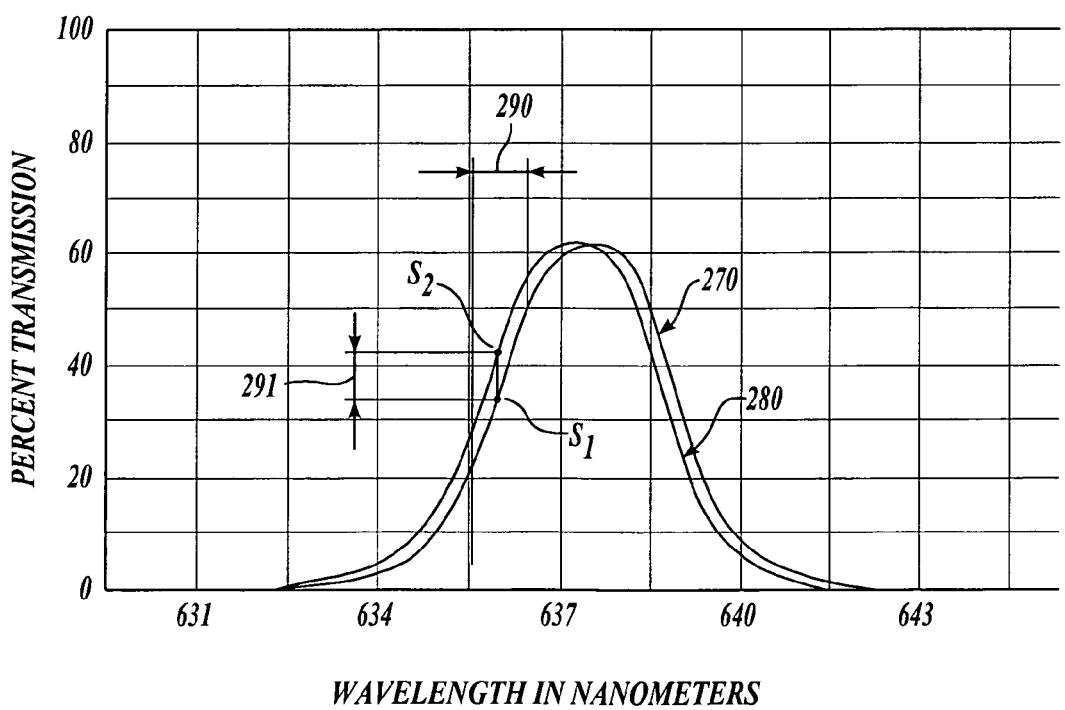
FIG. 6 is a transmission spectrum diagram illustrating an operation of a measurement system for providing signals from a filter structure according to the principles of this invention.

In one exemplary embodiment of the measurement system 200, the design may be focused on measuring wavelength drifts in the 635 nm region using a bandpass filter for the filter structure 120 or 220. FIG. 6 is a transmission spectrum diagram corresponding to one exemplary embodiment for providing signals from a bandpass filter structure according to the principles of this invention. FIG. 6 shows a first transmission curve 270 corresponding to the characteristics of the bandpass filter for an incident beam at 0° angle of incidence. For this angle, the filter has a center wavelength $\lambda_0$ approximately equal to 638 nm; a "full width half maximum" (FWHM) pass band of approximately 3 nm; and a peak transmission $T_0$ of approximately 62%. FIG. 6 also shows a second transmission curve 280 for the same bandpass filter corresponding to an incident beam at a non-zero angle of incidence, which in general corresponds to shifting the center wavelength $\lambda_0$ of the transmission curve of the filter to a shorter wavelength, as previously described with reference to EQUATION 1.

FIG. 6 shows a desirable operating region 290 of the transmission curves 270 and 280. For convenience, transmission curves are also referred to as signal curves in the following discussion, and signal values along the curves are described. It will be understood that for a beam of any particular wavelength and respective incident angle, the respective transmission curve ideally determines the resulting filter signal from the corresponding detector. The operating region 290 is desirably, but not necessarily a linear region. In the following discussion it is assumed to be linear to simplify the associated discussions. Most importantly, the operating region is a region where the signal curves 270 and 280 overlap, so that a single source wavelength gives rise to two useful output signals along the two respective beam paths through the filter. The exemplary operating region 290 extends from approximately 635.5 nm to approximately 636.5 nm, and is thus suitable for extremely fine wavelength discrimination over this operating range.

It should be appreciated that for signals produced according to the principles of this invention, the signal curves 270 and 280 in the operating region 290 are essentially the same curve with a slight wavelength shift. Accordingly, for any wavelength in the operating range 290, a signal difference 291 between two signals S1 and S2 will be nominally constant. At nominal, perfectly controlled operating conditions, either signal curve could be used to determine a wavelength to high accuracy. However, changes in each signal can arise from variations in the power of the incident beam, or from a change in the nominal gain of the detectors, for example due to power supply variations, common-mode environmental variations, or the like. Many such changes will be proportional for both signals in a measuring system according to the principles of this invention. In such cases any wavelength in the operating range 290 can be accurately determined by normalizing the signals with respect to common-mode power and gain variations. In one exemplary embodiment, the effects of common-mode power and gain variations in each signal are effectively overcome by determining the wavelength as function, $f$, of a combined signal ratio as follows:

$$\lambda_{act} = f[(S2+S1)/(S2-S1)] \quad (Eq.2)$$

Alternative combined signal ratio expressions may be used in various other embodiments, as will be apparent to one of ordinary skill in the art. As previously mentioned, a lookup table or other conversion method may be utilized to convert the ratio according to EQUATION 2, or an alternative signal ratio, to the associated source wavelength $\lambda_{act}$ or to determine a change in the source wavelength relative to a reference or initial source wavelength. For cases where the operating region 290 is not sufficiently linear, it will be appreciated that an appropriately accurate lookup table or conversion method may be experimentally determined.

In one exemplary embodiment of the measurement system 200 corresponding approximately to FIG. 6, it is desirable to provide a non-zero angle θ such the resulting shift in the center wavelength $\lambda_0$ is approximately 0.25 nm. For such an embodiment, with $\lambda_0$=637.5 nm, $N_e$=1, and N*=2.0, for example, it can be determined based on EQUATION 1 that an incident beam at angle θ=4.0° will provide a transmission curve centered at approximately $\lambda_0$=637.25 nm, to provide the desired shift of approximately 0.25 nm in the center wavelength $\lambda_0$. To calculate the grating characteristics associated with an incident beam at angle θ=4.0°, the grating equation d*sin θ=mλ can be used where d is the grating pitch and m is the order number (=1 for this case). For θ=4.0° and a source wavelength of 635 nm, the equation yields d=9.1 μm.

In this exemplary embodiment of the measurement system 200, for a 2 mm thick filter 220 and θ=4.0°, the centers of the transmitted beam 212 and the angled beam 216 will be separated by ~0.14 mm at the back surface of the filter 220. When miniature detectors are used for the detectors 250 and 255, and the beam diameter of the incident beam is on the order of 0.1 mm, theoretically, the diameter or width of the filter 220 and the grating 210 may be on the order of 1 mm or much smaller to provide a miniature measurement system 200. However, in various other exemplary embodiments, the beam diameter of the incident beam 202 may conveniently be on the order of ½ millimeter, and the detectors 250 and 255 may each have a detection area diameter or width on the order of 1 millimeter and have a center-to-center spacing of approximately 1 millimeter. Thus, in various exemplary embodiments, the overall diameter or width of a miniature measurement system according to this invention may conveniently be approximately 3 millimeters and the length of the miniature measurement system along the direction of the incident beam 202 may be on the order of 14 mm to provide the desired separation for the filtered beam 232 and angled filtered beam 236 at the detectors 250 and 255. In various exemplary embodiments, the spacing from the grating 210 to the front surface of the filter 220, and/or the spacing from the back surface of the grating 210 to the detectors 250 and 255 can be set to any spacing that provides a different desired separation for the filtered beam 232 and angled filtered beam 236 and for the detectors 250 and 255. In various exemplary embodiments a glass spacer block can be used to provide the desired spacing.

Although the foregoing description is generally in terms of the bandpass filter characteristics shown in FIG. 6, it will be appreciated that the operating regions similar to the operating range 290 may be provided by other filter types and their corresponding transmission curves, when beam paths having suitable angles of incidence are provided. A filter corresponding to the filter curve 82 previously discussed with respect to FIG. 3B is usable, as one example. Thus, it will be appreciated that in various exemplary embodiments according to this invention, filter types other than bandpass filters, including loss pass filters, high pass filters and notch filters, may be used over appropriate operating ranges.

Figure 7:
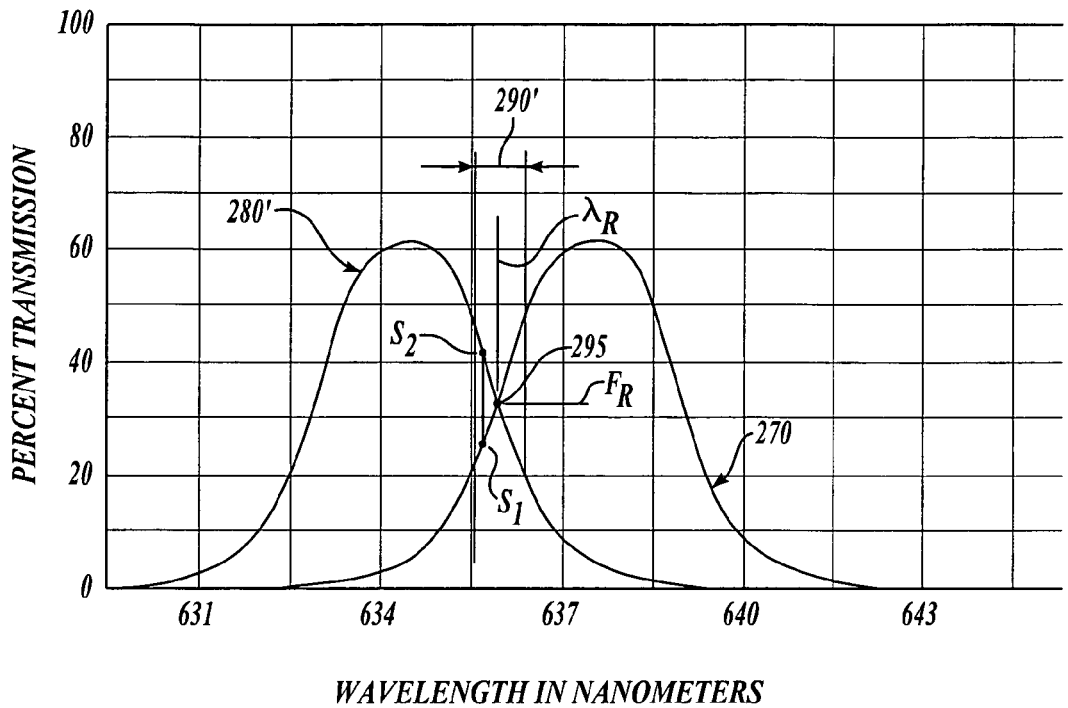
FIG. 7 is a transmission spectrum diagram illustrating an alternate operation of a measurement systems for providing signals from a filter structure according to the principles of this invention.

FIG. 7 is a transmission spectrum diagram illustrating a second exemplary embodiment for providing signals from a bandpass filter structure according to the principles of this invention. FIG. 7 is similar to FIG. 6, except the transmission curve 280 has been shifted to provide the transmission curve 280' by using an increased angle of incidence for the corresponding beam. In various exemplary embodiments according to this invention, it is desirable to provide a non-zero angle θ such the resulting shift in the center wavelength $\lambda_0$ is approximately the FWHM pass band width of 3 nm, so the signal curves 270 and 280' are related approximately as shown in FIG. 7. FIG. 7 shows a desirable operating region 290' of the transmission curves 270 and 280'. The transmission curves 270 and 280' coincide at a crossover point 295. In various exemplary embodiments, the crossover point 295 corresponds to a nominal reference radiation wavelength $\lambda_R$ at a nominal reference temperature $T_R$ of a filter. Furthermore, the crossover point 295 corresponds to a nominal reference signal value $F_R$ at a nominal signal power/gain level $P_R$, as discussed with reference to EQUATIONS 4A-4D, below.

Similarly to the operating region 290, the operating region 290' is desirably, but not necessarily, a linear region. In the following discussion it is assumed to be linear to simplify the associated discussions. Most importantly, the operating region is a region where the signal curves 270 and 280' overlap, so that a single source wavelength gives rise to two useful output signals along the two respective beam paths through the filter. In this example, for any wavelength in the operating range 290', the sum of the two signals S1 and S2 will be nominally constant. At nominal, perfectly controlled operating conditions, either signal curve could be used to determine a wavelength to high accuracy. However, as previously discussed with reference to FIG. 6, changes in each signal can arise from variations in the power of the incident beam, or from a change in the nominal gain of the detectors, for example due to power supply variations, common-mode environmental variations, or the like. Many such changes will be proportional for both signals in a measuring system according to the principles of this invention. In such cases any wavelength in the operating range 290 can be accurately determined by normalizing the signals with respect to common-mode power and gain variations. In one exemplary embodiment, the effects of common-mode power and gain variations in each signal are effectively overcome by determining the wavelength as function of a combined signal ratio as follows:

$$\lambda_{act} = f[(S2-S1)/(S2+1)] \quad \text{(Eq.3)}$$

Alternative combined signal ratio expressions may be used in various other embodiments, as will be apparent to one of ordinary skill in the art. Similar to the previous discussion with reference to EQUATION 2, for cases where the operating region 290' is not sufficiently linear, it will be appreciated that an appropriately accurate lookup table or conversion method may be experimentally determined.

In one exemplary embodiment of the measurement system 200 corresponding approximately to FIG. 7, it is desirable to provide a non-zero angle θ such the resulting shift in the center wavelength $\lambda_0$ is approximately 3.0 nm. For such an embodiment, with $\lambda_0$=637.5 nm, $N_e$=1, and N*=2.0, for example, it can be determined based on EQUATION 1 that an incident beam at angle θ=11.2° will provide a transmission curve centered at approximately $\lambda_0$=634.5 nm, to provide the desired shift of approximately 3.0 nm in the center wavelength $\lambda_0$. To calculate the grating characteristics associated with an incident beam at angle θ=11.2°, the grating equation d*sin θ=mλ can be used where d is the grating pitch and m is the order number (=1 for this case). For θ=11.2° and a source wavelength of 635 nm, the equation yields d=3.27 μm.

In this exemplary embodiment of the measurement system 200, for a 2 mm thick filter 220 and θ=11.2°, the centers of the transmitted beam 212 and the angled beam 216 will be separated by ~0.40 mm at the back surface of the filter 220. When miniature detectors are used for the detectors 250 and 255, and the beam diameter of the incident beam is on the order of 0.3 mm, theoretically, the diameter or width of the filter 220 and the grating 210 may be on the order of 1 mm or much smaller to provide a miniature measurement system 200. However, in various other exemplary embodiments, the beam diameter of the incident beam 202 may conveniently be on the order of ½ millimeter, and the detectors 250 and 255 may each have a detection area diameter or width on the order of 1 millimeter and have a center-to-center spacing of approximately 1 millimeter. Thus, in various exemplary embodiments, the overall diameter or width of a miniature measurement system according to this invention may conveniently be approximately 3 millimeters and the length of the miniature measurement system along the direction of the incident beam 202 may be on the order of 5 mm to provide the desired separation for the filtered beam 232 and angled filtered beam 236 at the detectors 250 and 255. In various exemplary embodiments, the spacing from the grating 210 to the front surface of the filter 220, and/or the spacing from the back surface of the grating 210 to the detectors 250 and 255 can be set to any spacing that provides a different desired separation for the filtered beam 232 and angled filtered beam 236 and for the detectors 250 and 255. In various exemplary embodiments a glass spacer block can be used to provide the desired spacing.

It should be appreciated that for the transmission curve configurations shown in either of the FIGS. 6 and 7, in various exemplary embodiments according to this invention the signals S1 and S2 are derived from beams that have traveled through only the same physical elements and interfaces after their division from a single source beam. Thus, in comparison to prior art systems, certain errors due to minor variations in nominal filter characteristics variations in filter characteristics over temperature, alignment variations, power attenuation along the beam path due varying materials or contamination, and the like, are largely rejected as common-mode errors according to the principles of this invention.

Figure 8:
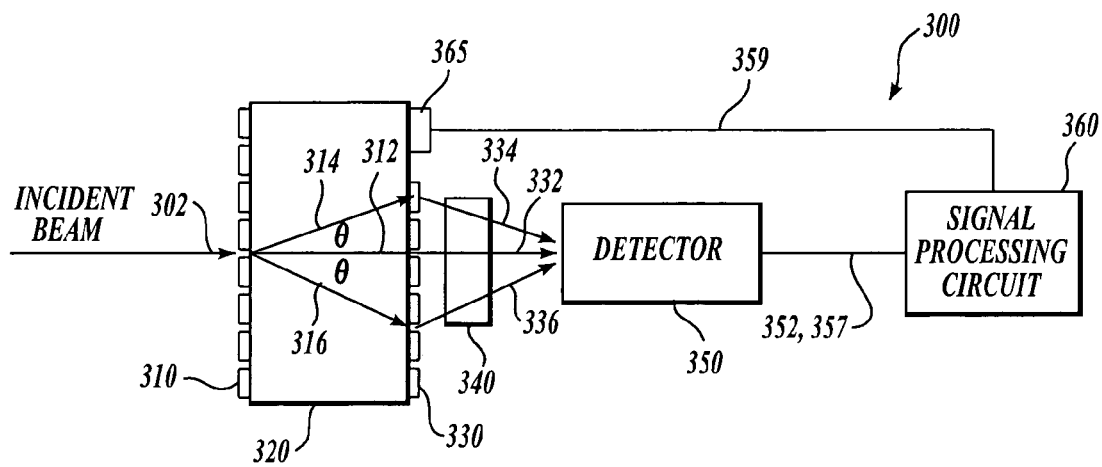
FIG. 8 is a block diagram of a second alternate embodiment of a measurement system with a filter structure, two gratings, an optical shutter, and a detector for measuring a wavelength shift of a radiation source in accordance with the present invention.

FIG. 8 is a block diagram of a measurement system 300 that illustrates a second alternate embodiment of the present invention. The measurement system 300 includes a grating 310, a filter 320, a grating 330, a shutter 340, a detector 350, a signal processing circuit 360, and a temperature sensing element 365. In one embodiment, the gratings 310 and 330 may be directly deposited on the filter 320, or in another embodiment may be deposited on substrates that are glued onto the filter. In various other embodiments the gratings 310 and 330 are simply mounted at a desired distance from the two sides of the filter 320 by any suitable mechanical means. The measurement system 300 differs from the measurement system 200 of FIG. 5 by the use of the second grating 330, the shutter 340, and the single detector 350.

As shown in FIG. 8, an incident input beam 302 is split by the grating 310 into a transmitted beam 312, and +/− first order angled beams 314 and 316. The transmitted beam 312 and the first order angled beams 314 and 316 pass through the filter structure 320 to provide filter signals from different filter paths according to the principles of this invention. After passing through the filter 320 the transmitted beam 312 and the first order angled beams 314 and 316 are deflected by the grating 330 to provide filtered beam 332 and angled filtered beams 334 and 336, approximately as shown. It will be appreciated that in order for the angled filtered beams 334 and 336 to converge to a single detector, the grating 330 will generally have a finer pitch than the grating 310. All the filtered beams 332, 334, and 336 are directed such that they can all reach the detector 350, subject to the operation of the shutter 340. It will also be appreciated that the shutter 340 effectively provides two detector channels that share the single detector 350. The detector 350 provides two different signals at different times, as determined by the action of the shutter 340.

The filtered beams 332, 334, and 336 all pass through the shutter 350 before being incident on the detector 360. The shutter 350 allows the measuring system to selectively switch between the filtered beams 332, 334 and 336. In various exemplary embodiments, the shutter 350 is a multi-aperture shutter providing an aperture for each of the filtered beams 332, 334 and 336 and may be constructed from any suitable now known or later developed shutter, light valve, or beam steering device usable to select which of the beams 332, 334 and/or 336 are incident on the detector 350. In various embodiments a MEMS based shutter, light valve, or beam steering device is used. Suitable MEMS devices are disclosed in one or more of U.S. Pat. Nos. 6,226,116, 6,313,937, and 6,275,320, all of which are incorporated herein by reference in their entirety. Alternatively, the miniature Optical Shutter Array Platform commercially available from Coventor Inc. of Cary, N.C., USA may be adapted to provide the shutter 350. In various other exemplary embodiments, the shutter 350 may be constructed from any suitable now known or later developed configuration of miniature conventional electromechanical actuator(s) or motor(s), shutters, and/or apertures. In yet other exemplary embodiments, the shutter 350 may be constructed from any suitable now known or later developed LCD light valve configurations. In any case, once the beams are incident on the detector 350, the detector 350 provides at least two outputs 352 and 357 to the signal processing circuit 360, as previously described.

In addition to the previously stated advantages of various exemplary measuring systems according to the principles of this invention, the embodiment shown in FIG. 8 further reduces measuring systems errors due to signal variations caused by individual detector variations. For example, certain errors due to minor variations in nominal detector characteristics, variations in detector characteristics over temperature, alignment variations, power attenuation along the beam path due varying materials or contamination, and the like, are largely rejected as common-mode errors according to the configuration shown in FIG. 8.

It should be appreciated that, in general, the filter characteristics of optical filters vary somewhat with temperature. In particular, for filters characterized by a peak or central transmission wavelength, the central wavelength (that is, the entire transmission curve) can shift with temperature. With reference to FIG. 6, this is approximately equivalent to shifting the transmission curve 270 or 280 to a higher or lower wavelength in proportion to a change in the temperature of the filter. Thus, as discussed in greater detail below, temperature effects may be approximately indistinguishable from changes in the angle of incidence of a beam. Similarly, in the absence of additional information, a signal change due to temperature effects in the filter may be indistinguishable from a wavelength change of the radiation entering the filter.

In various applications of exemplary measuring system embodiments according to this invention, the wavelength measurement resolution and accuracy of the measuring systems is sufficient without correcting the signals for temperature effects. In one exemplary embodiment, a filter with low temperature sensitivity is used. For example, commercially available Dense Wavelength Division Multiplexing (DWDM) filters, such as the family of DWDM bandpass filters from the vendor Edmund Scientific, have a temperature sensitivity of approximately 0.001 nm/° C. That is, the center wavelength of the filter changes by approximately 0.001 nm/° C. Thus, in many applications where the operating environment is relatively stable, +/−5° C. for example, the associated errors are on the order of only +/−0.005 nm, or approximately 8 ppm for 635 nm light.

However, in various other applications of exemplary measuring system embodiments according to this invention, the wavelength measurement resolution and accuracy of the is desired to be on the order of 1 ppm or better. In such applications, the signals must be compensated for temperature effects in the filter structure. FIG. 8 shows the temperature sensing element 365, which provides a temperature signal output 357 that provides a temperature signal to the signal processing circuit 360. In various exemplary embodiments the temperature sensing element 365 may be any one of a thermistor, a thermocouple, an RTD, a current-output temperature device, or any other suitable now known or later developed temperature sensing element.

The temperature signal is usable by the signal processing circuit 360 to compensate for temperature effects in the filter structure 320. As previously described, the effect of a temperature change is approximately equivalent to shifting the transmission curves 270, 280 and/or 280' shown in FIGS. 6 and 7 to higher or lower wavelengths in proportion to the change in the temperature of the filter. Thus, in various exemplary embodiments, in order to achieve a temperature-compensated determination of changes in a source wavelength, a ratio based on the respective filter signals arising from the overlapping transmission curves is determined by the signal processing circuit 160 as described elsewhere herein. Based on the value of the temperature signal relative to a reference or initial temperature signal, a lookup table or other conversion method is then utilized to compensate or convert the signal ratio to its expected value at the reference or initial temperature. The lookup table or other conversion method may be determined experimentally by varying the measuring device temperature in a controlled manner, and determining the corresponding variations in the filter signals or the signal ratio for various source wavelengths. The compensated or converted signal ratio accurately corresponds to the source wavelength or frequency independent of the effects of temperature on the filter. Alternatively, each detector signal may be temperature-compensated prior to determining the signal ratio.

In various measuring system embodiments according to this invention, the temperature compensation methods and apparatus described above are satisfactory. However, in various other measuring system embodiments according to this invention, better accuracy and/or simpler measurement systems may result from the use of additional filter path signals according to this invention in order to determine or compensate for variations in the filter operating temperature, as described in detail below.

Figure 9:
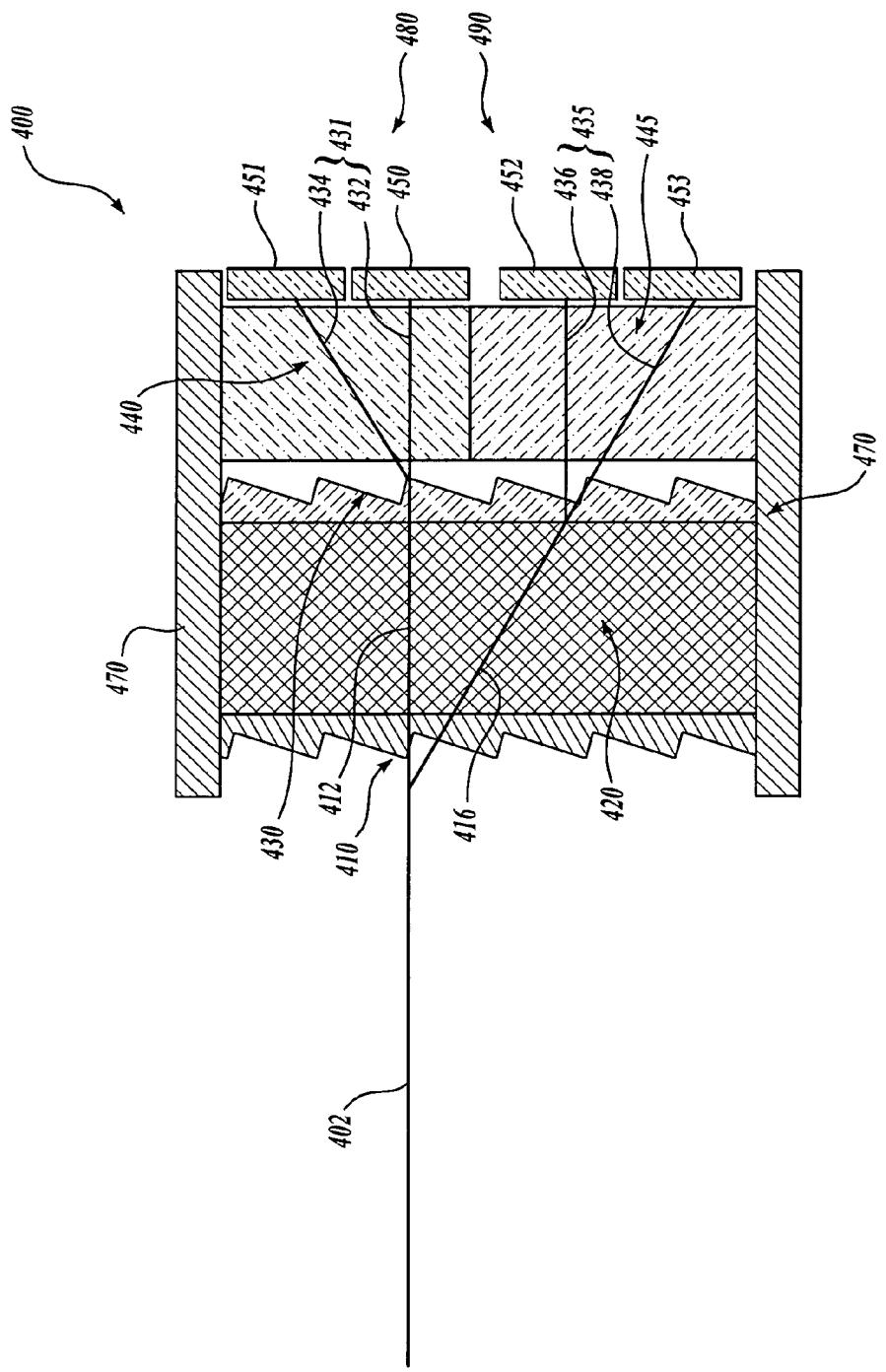
FIG. 9 is a block diagram of a third alternate embodiment of a measurement system utilizing two filter structures and two diffraction gratings and a photodetector array for detecting four beams for measuring the wavelength shift of a radiation source in accordance with the present invention.

FIG. 9 shows a measurement system 400 that illustrates a third alternate embodiment of the present invention. As will be described in more detail below, the measurement system 400 utilizes similar concepts to those described above with respect to FIGS. 4–8, except that rather than using one filter structure to produce two beams, the measurement system 400 utilizes two filter structures to produce four beams. In various exemplary embodiments, with signal processing according to this invention, as described further below, this configuration allows further improvements in the accuracy of the measuring system. Some of the improvements include substantially reducing wavelength measurement errors not only due to power variations, but also due to variations in environmental conditions and, in particular, errors due to temperature changes of the filter components of the measuring system 400.

The measurement system 400 includes a first diffraction grating 410, an optically transparent substrate 420, a second diffraction grating 430, filter structures 440 and 445, and a photodetector array with four photodetectors 450, 451, 452 and 453. All of these components are contained within a housing 470. An incident input beam 402 is split into an incident zeroth order beam 412 and an incident first order beam 416 by the grating 410. After passing through the transparent substrate 420, the incident beam 412 is split by the grating 430 to provide a first filtered beam pair 431 which includes a filtered beam 432 and an angled filtered beam 434. Similarly, the incident first order beam 416 is split by the grating 430 to provide a second filtered beam pair 435 which includes a filtered beam 436 and an angled filtered beam 438. In the exemplary embodiment shown in FIG. 9, the diffraction gratings 410 and 430 are blazed grating fabricated to the same specifications, except that one is reversed so that the blaze angle generates the four radiation beams 432, 434, 436, and 438 along operable directions approximately as shown in FIG. 9, while suppressing other diffraction orders along other radiation paths that may interfere with the optical signals along the primary paths shown. The grating pitch may determined as previously described to provide desired angles of incidence in a particular embodiment. In one embodiment, the diffraction gratings 410 and 430 are blazed to produce radiation beams of equal efficiency in the zeroth and first order diffraction beams, while suppressing other orders, as is commonly known in the art for such diffraction gratings. It will be appreciated that the grating parameters such as the grating pitch are not shown to scale in FIG. 9.

The filtered beam 432 and angled filtered beam 434 pass through the bandpass filter structure 440 to the detectors 450 and 451, respectively. In one embodiment, the narrow bandpass filter structure 440 has a relatively small temperature dependence. The filtered beam 436 and angled filtered beam 438 pass through the bandpass filter structure 445 to the detectors 452 and 453, respectively. In one embodiment, the narrow bandpass filter structure 445 has a relatively large temperature dependence. It will be appreciated that the detector array with the detectors 450–453 allows simultaneous measurement of multiple beams while utilizing a single compact assembly. In various exemplary embodiments, the detectors that are utilized for the array can be separate discrete detectors or a monolithic combined array, such as a quadrant array, which can simplify detector calibration and enhance common mode rejection of errors. For example, in various exemplary embodiments, the combined array is used because the temperature sensitivities of the various detectors 450–453 are approximately identical, or at least highly correlated. Consequently, residual detector sensitivities due to temperature variations and other environmental effects can be reliably compensated to high accuracy in a practical system design. In addition, the parts cost and complexity of the measuring system design is substantially reduced. In an alternate embodiment, the planarly constructed assembly of the measurement system 400 may be extended into the figure with additional columns of detectors implemented for simultaneous detection and measurement of multiple beams of radiation, each having a different wavelength.

As described above, after passing through both of the diffraction gratings 410 and 430, the incident input beam 402 has been split into four separate filtered beams 432, 434, 436, and 438. Filtered beams 432 and 436 pass through the filter structures 440 and 445 at normal incidence, while the angled filtered beams 434 and 438 pass through the filter structures 440 and 445 at prescribed angles. This configuration provides a respective pair of separate filter signals according to this invention corresponding to each of the filter structures 440 and 445, respectively. That is, each filter structure respectively provides a pair of filter signals, as was described above with regard to the embodiments that provide a single pair of filter signals from a single filter structure. Accordingly, the measurement system 400 provides additional measurement signals that, with appropriate signal processing, can be used to determine temperature variations and/or compensate temperature errors, in comparison to the previously described measurement systems 100, 200 and 300. The filter temperature response of the measurement system 400 and various related signal processing principles with regard to the two signal pairs will be described in more detail below.

The measurement system 400 of FIG. 9 can, for purposes of explanation, in one embodiment be considered to include two measurement subsystems 480 and 490. Each may be constructed according to previously described principles. However each respective subsystem 480 and 490 uses a filter with a similar center wavelength and operating region, but one filter is selected or designed with a relatively smaller temperature dependence and one with a relatively higher temperature dependence. Two signals are provided through each of the two measurement subsystems, for example by the detectors 450 and 451, and the detectors 452 and 453, respectively, so that the output of each measurement subsystem can be corrected for power normalization. In an alternate embodiment, three rather than four signals can be utilized, because it can be assumed that the input power changes similarly for both filters. However, the use of fours signals as described below allows an extra margin of accuracy and reliability.

It will be appreciated that the two signals provided by the measurement systems previously described with reference to FIGS. 4–8 are generally designed to compensate for power variation induced wavelength measurement errors. Alternatively, if power variations are reduced to negligible levels by any now known or later developed means, and a suitable temperature sensor is added, then temperature induced measurement errors may nominally be determined and compensated. However, more generally, if there are both non-negligible power variations and temperature variations, then the measurement systems previously described with reference to FIGS. 4–8 may in some embodiments not be designed to compensate for both temperature and power change error contributions. In contrast, a system providing and utilizing three or four signals, such as the measurement system described with reference to FIG. 9, is designed to compensate for both temperature and power changes.

In principle, each subsystem will determine an apparent wavelength change that includes both the actual wavelength change and a temperature dependent contribution to the apparent wavelength change that is intentionally controlled and made unique for each subsystem. It should be appreciated that the subsystems according to this invention are highly accurate and stable with respect to potential error sources other than temperature errors. As a result, a relationship between the apparent wavelength change indicated by the two subsystems may be reliably related to temperature, based on analysis, experiment and/or calibration. Thus, the temperature errors of either or both subsystems can be eliminated. For example, it will be appreciated that an appropriately accurate lookup table or conversion method may be experimentally determined such that a relationship between the subsystem signals is usable to determine the filter temperature. The filter temperature may then be used to correct the wavelength indicated by that filter subsystem. Alternatively, a relationship between two particular subsystem wavelength indications may be used to directly look up or compute a temperature corrected wavelength.

The following is an example analysis for determining one set of exemplary equations by which four signals can be utilized to produce two equations which can be used to solve for the two unknown variables of temperature and power changes. The analysis assumes two subsystems, each subsystem filter set having two overlapping filter transmission curves according to FIG. 7, accounting for the signs of various terms in the EQUATIONS 4A–4D. The two filter sets are differentiated in nomenclature by unprimed and primed symbols. According to the previous discussion, the signals in the unprimed filter paths will have a different wavelength and temperature dependence than signals in the primed filter paths. For clarity of explanation of the basic principles, we assume that the two overlapping filter transmission curves according to FIG. 7 within a subsystem have the same transmission characteristics (but of opposite slopes) and the same temperature dependence. The signals are defined with reference to a crossover point 295 previously described with reference to FIG. 7.

The following nomenclature is utilized:

$P/P_R$ is the ratio of a current signal power P to a reference signal power $P_R$;

$S_1, S_2, S_1', S_2'$ are the signals arising from each of the four filter paths;

$F_0$ and $F_0'$ are the respective signals associated with transmission of each filter at the at crossover point for each subsystem, at the signal power $P_R$;

$\Delta\lambda$ is the wavelength change to be determined, relative to the crossover point of a subsystem; and $\Delta T$ is the temperature change.

The power transmitted through each of the 4 filters is thus:

$$S_1 = \frac{P}{P_R}\left(F_0 + \frac{\partial F}{\partial \lambda}\Delta\lambda + \frac{\partial F}{\partial T}\Delta T\right) \quad \text{(Eq. 4A)}$$

$$S_2 = \frac{P}{P_R}\left(F_0 - \frac{\partial F}{\partial \lambda}\Delta\lambda - \frac{\partial F}{\partial T}\Delta T\right) \quad \text{(Eq. 4B)}$$

$$S_1' = \frac{P}{P_R}\left(F_0' + \frac{\partial F'}{\partial \lambda}\Delta\lambda + \frac{\partial F'}{\partial T}\Delta T\right) \quad \text{(Eq. 4C)}$$

$$S_2' = \frac{P}{P_R}\left(F_0' - \frac{\partial F'}{\partial \lambda}\Delta\lambda - \frac{\partial F'}{\partial T}\Delta T\right) \quad \text{(Eq. 4D)}$$

The first goal of the analysis is to remove the dependence of the output on P. Thus, for each set of filters the ratio between the two filter outputs within that set is taken. When the last two terms in EQUATIONS 4A–4D are assumed to be small, as will almost always be the case in actual use, the following equations result:

$$S = \frac{S_1}{S_2}\left(1 + \frac{2}{F_0}\frac{\partial F}{\partial \lambda}\Delta\lambda + \frac{2}{F_0}\frac{\partial F}{\partial T}\Delta T\right) \quad \text{(Eq. 5A)}$$

$$S' = \frac{S_1'}{S_2'}\left(1 + \frac{2}{F_0'}\frac{\partial F'}{\partial \lambda}\Delta\lambda + \frac{2}{F_0'}\frac{\partial F'}{\partial T}\Delta T\right) \quad \text{(Eq. 5B)}$$

It will be appreciated that if $\Delta T$ is very small (i.e. negligible), the analysis could in some instances be completed at this point by using S or S' to deduce $\Delta\lambda$. Otherwise, the two power-normalized ratios form two equations in two unknowns for which $\Delta\lambda$ can be solved using the following equation:

$$\Delta\lambda = \frac{F_0}{2\frac{\partial F}{\partial \lambda}}(S-1)\frac{1}{1 - \frac{\partial T}{\partial F'}\cdot\frac{\partial \lambda}{\partial F}\frac{\partial F'}{\partial T}\frac{\partial F}{\partial \lambda}} + \frac{F_0'}{2\frac{\partial F'}{\partial \lambda}}(S'-1)\frac{1}{1 - \frac{\partial T}{\partial F}\cdot\frac{\partial \lambda}{\partial F'}\frac{\partial F}{\partial T}\frac{\partial F'}{\partial \lambda}} \quad \text{(Eq. 6)}$$

It will be appreciated that in some instances, in order to get the best temperature error correction, it is advantageous to have $$\frac{\partial F}{\partial T}$$

and $$\frac{\partial F'}{\partial T}$$

be as different as possible. Furthermore, if $$\frac{\partial F}{\partial T}$$

is generally larger than $$\frac{\partial F'}{\partial T},$$

then it is advantageous to have $$\frac{\partial F'}{\partial \lambda}$$

be as small as possible. Conversely, if $$\frac{\partial F'}{\partial T}$$

is generally larger than $$\frac{\partial F}{\partial T},$$

then it is advantageous to have $$\frac{\partial F}{\partial T}$$

as small as possible. It will also be appreciated that in some instances it is not necessary to use 2 filters per set in order to normalize the power. It is also possible to use just one detector with no filter to normalize the power for either $S_1$ and $S_1'$ or $S_2$ and $S_2'$. In this case, there are again two equations and two unknowns, where $S_N$ and $S_N'$ are the filter functions corresponding to $S_1$ and $S_1'$, for example, in Equations 4A–4D, but with the power term removed by normalization, i.e., $S_N = S_1(P_R/P)$, as illustrated by the following equations:

$$S = \left(F_0 + \frac{\partial F}{\partial \lambda}\Delta\lambda + \frac{\partial F}{\partial T}\Delta T\right) \quad \text{(Eq.7A)}$$

$$S' = \left(F_0' + \frac{\partial F'}{\partial \lambda}\Delta\lambda + \frac{\partial F'}{\partial T}\Delta T\right) \quad \text{(Eq.7B)}$$

It can be shown that the solution for $\Delta\lambda$ is very similar to that of EQUATION 6, but with $F_0$ replaced by $2F_0$ and S and S' replaced by $S_N/F_0$ and $S_N'/F_0'$, respectively. However, it should be appreciated that this approach may reduce the wavelength measurement sensitivity.

It will be appreciated that with regard to detector variations in a four-channel system such as that described above, that the most important effects are detector offsets and detector gain variations. In one embodiment, it is desirable to reduce these effects to less than 0.1% of the nominal signal levels. One method of reducing the effects is to use four matched detectors. In addition to using four matched detectors, a multiplexer may be used to have the four detectors all read out by a single amplifier. When a wavelength measurement system according to this invention is incorporated in a precision instrument to monitor a radiation source wavelength, another method for reducing the effects of the detector offset and gain is to modulate the radiation source intensity at some frequency during the wavelength measurements and determine signal values based on the modulated signals. Yet, another method for reducing the effects for a given filter subsystem is to, instead of taking the ratio $$\frac{S_1}{S_2}$$

and/or $$\frac{S_1'}{S_2'},$$

take the ratio $$\frac{S_1 - S_2}{P} \text{ and/or } \frac{S_1' - S_2'}{P}$$

to provide common-mode offset cancellation.

Figure 10B:
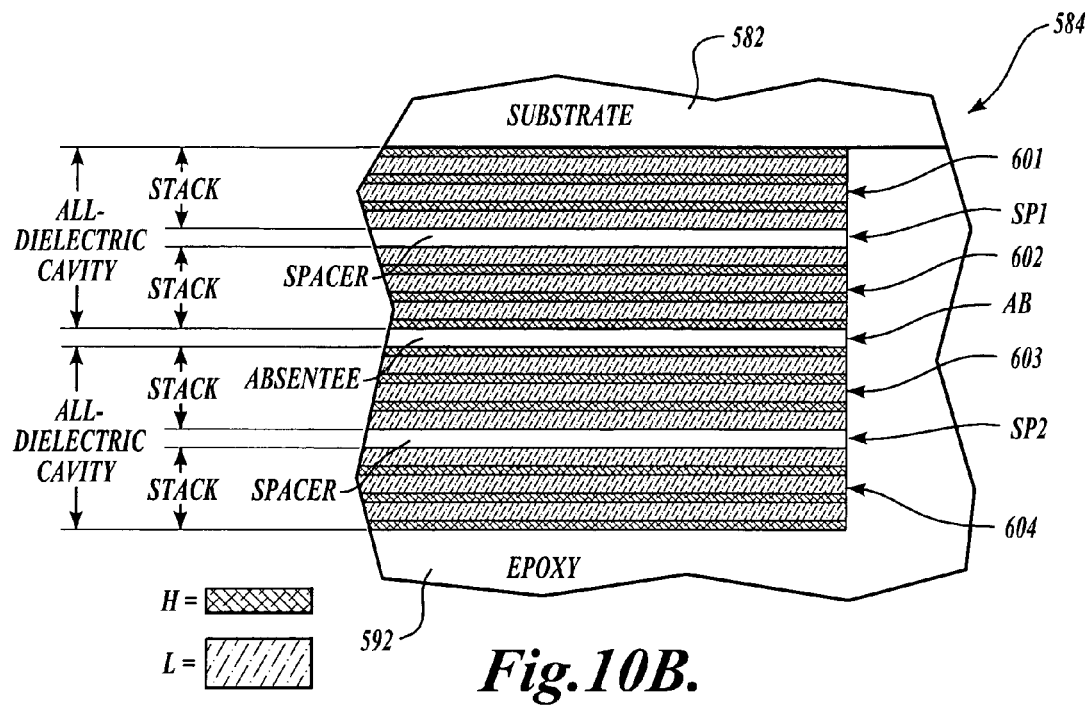
FIG. 10B is a diagram illustrating the construction of one of the multilayer-dielectric bandpass filters of FIG. 10A.
Figure 10A:
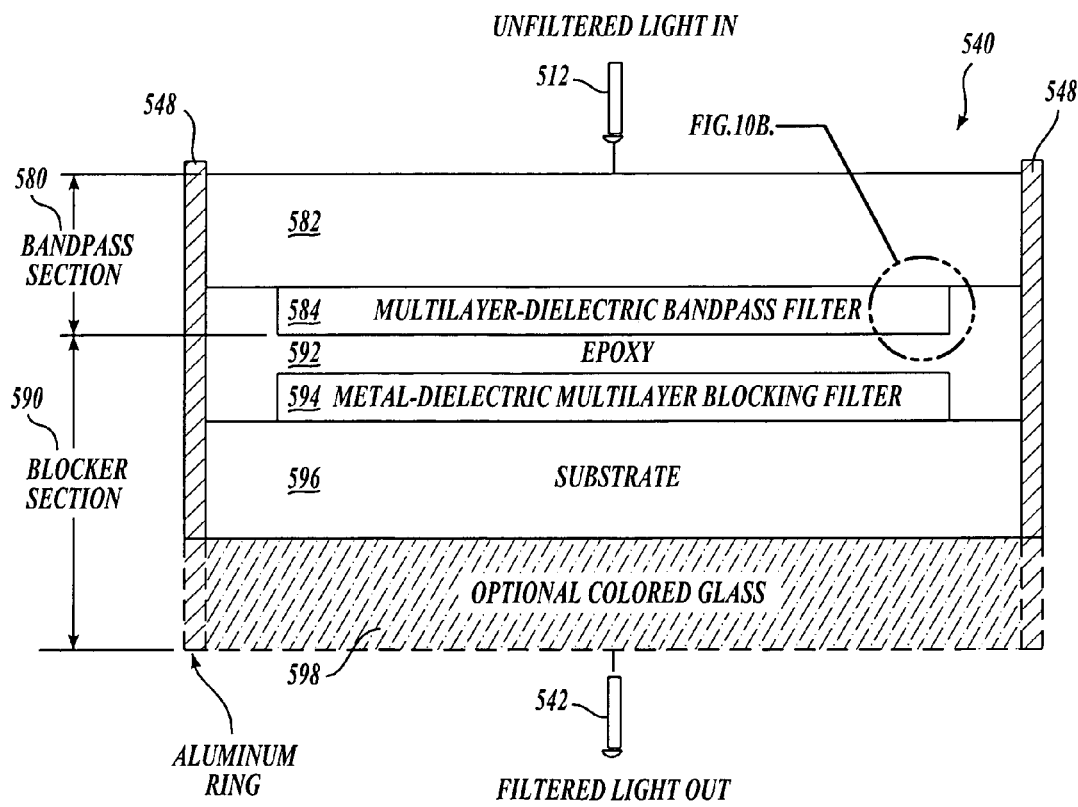
FIG. 10A is a diagram illustrating the layers utilized in the construction of one of the filter structures of the system of FIG. 9.

FIG. 10A is a diagram illustrating one exemplary generic construction of a filter 540 with a selected temperature dependency. Such a generic construction is usable for the filters 440 and 445 in FIG. 9. In general, different temperature dependency may in one embodiment be achieved by one or both of two methods: using different materials that have different temperature dependencies; or using the same materials in a different multilayer filter configuration. With regard to the multilayer filter configuration, multiple layers (i layers total) making up a filter stack can have their thicknesses $t_i$ changed by an integer wavelength multiple $N\lambda$, where $\lambda$ is the effective wavelength within the material, to achieve approximately the same filter wavelength characteristics (same phase at all reflective boundaries) but different temperature dependence. As a specific example of this multilayer filter design method, if one design calls for a layer that is a quarter wave thickness ($t=\lambda/4$), the thickness can be adjusted to an integer number N of the wavelength thicker, i.e., $t=(N+\frac{1}{4})\lambda$, $N=1,2,3 \ldots$. This layer will have same optical properties as the original layer but a different temperature dependence than the original layer. This defines the thickness, thus the phase of reflected radiation will change at a different rate because of a dependence on temperature. The index of refraction may also vary with temperature. The design may take this dependence into account as well. Both effects for small temperature changes will be linear. Depending on the material and the wavelength, these effects will add to or compensate each other. For a given filter, whatever effect temperature has on shifting the center wavelength of the transmission spectrum of the filter, by these combined mechanisms that effect will generally increase in magnitude with increasing N.

As shown in FIG. 10A, the filter 540 includes a bandpass section 580 and a blocker section 590, and is encased by a housing ring 548. In operation, the filter 540 receives an unfiltered radiation beam 512, and outputs a filtered radiation beam 542. The bandpass section 580 includes a substrate layer 582 and a multi-layer-dielectric bandpass filter 584. The construction of the multi-layer-dielectric bandpass filter 584 will be described in more detail below with respect to FIG. 10. The blocker section 590 includes an epoxy layer 592, a metal-dielectric multilayer blocking filter 594, a substrate layer 596, and an optional colored glass layer 598.

FIG. 10B shows one exemplary construction of the multilayer-dielectric bandpass filter 584 of FIG. 10A. As shown in FIG. 10B, the multilayer-dielectric bandpass filter 584 includes four stacked sections 601–604. The stacked sections 601 and 602 comprise an all-dielectric cavity, which is separated by an absentee layer AB from the stacked sections 603 and 604, which also comprises an all-dielectric cavity. The stacked sections 601 and 602 are separated by a spacer layer SP1, and the stacked sections 603 and 604 are separated by a spacer layer SP2. Each of the stacked sections 601–604 include layers of the simplest period.

It should be appreciated that the temperature characteristics of a filter depend on both the thermal expansion of the filter layers and the change in the refractive index of the layers with temperature. Thus, for multilayer filters, a variety of design alternatives exist, and a variety of optical filter vendors can provide a variety of standard or custom filters of alternative constructions that are usable according to the principles of this invention.

Figure 11:
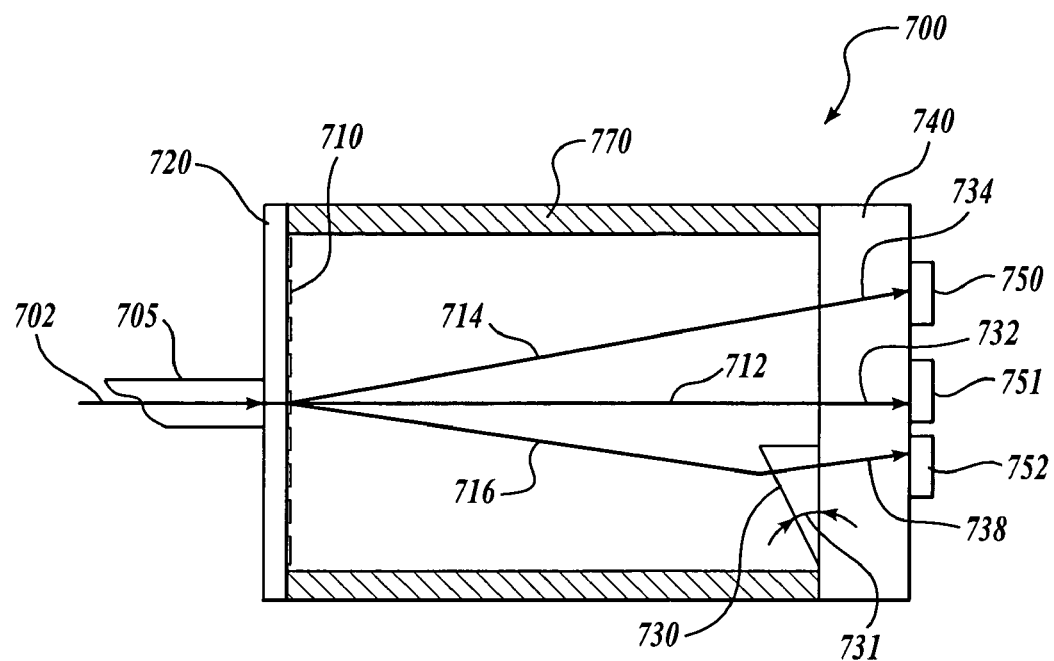
FIG. 11 is a block diagram of a fourth alternate embodiment of a measurement system utilizing a filter structure, a diffraction grating, a temperature sensitive beam deflector and a photodetector array for detecting three beams for measuring the wavelength shift of a radiation source in accordance with the present invention.

FIG. 11 is a block diagram of a fourth alternate embodiment of a measurement system according to the principles of this invention that provides three filter path signals from a single filter structure. One of the filter path signals is provided with a unique temperature dependence relative to the other two signals, such that temperature compensation may be provided according to previously described principles, but a single filter structure is used. As will be described in more detail below, the measurement system 700 shown in FIG. 11 utilizes similar concepts to those described above with respect to FIGS. 4–8.

The measurement system 700 includes a source input optical fiber 705 joined to a substrate 720 that carries a diffraction grating 710, a beam deflector 730, a filter structure 740, and a photodetector array with three photodetectors 750, 751, and 752. All of these components are joined together and to a spacer/housing 770 by any suitable now known or later developed attachment method. The grating pitch of the grating 710 may determined as previously described to provide desired angles of incidence in a particular embodiment. The source input optical fiber 705 delivers an incident input beam 702, which is split into an incident beam 712 and incident +/− first order beams 714 and 716 by the grating 710. The source input optical fiber 705 is properly aligned and rigidly joined to the substrate 720, providing a particularly simple, stable and reliable way to align the incident beams 702, 712, 714 and 716 to desired angles. It will be appreciated that a similar optical fiber arrangement may be similarly used to deliver the source radiation incident beam in numerous other measurement system embodiments described herein, with similar benefits.

The incident beam 712 and the first order beam 714 pass to the filter structure 740 to provide a filtered beam 732 and angled filtered beam 734. The filtered beam 732 and angled filtered beam 734 pass through the filter structure 740 to the detectors 750 and 751, respectively. The first order beam 716 passes to the deflector 730, which deflects the beam through a deflection angle to provide a desired angle of incidence for the angled filtered beam 738 relative to the filter structure 740. Furthermore, the deflector 730 provides a deflection angle that is temperature dependent, as described in detail below. In the exemplary embodiment shown in FIG. 11, the deflector 730 is a prism having a prism angle 731. However, in various other embodiments the deflector 730 may be any other now known or later developed beam deflecting element, including but not limited to passive optical elements and active beam steering elements such as MEMS devices and the like, which can provide a deflection angle that is temperature dependent according to the principles of this invention. The angled filtered beam 734 passes through the filter structure 740 to the detector 752.

It should be appreciated that each beam path through a single filter structure such as the angled filtered beam 738 has nominally the same center wavelength temperature dependence contribution from the angled filtered beam 738. Thus, in the measuring system embodiment 400 shown in FIG. 9, a second filter was used to provide a different center wavelength temperature dependence, and associated signals usable to determine and/or correct for filter temperature errors. In contrast, in the measuring system embodiment 700, the deflector 730 provides a deflection angle that is temperature dependent to provide a filter path having a different center wavelength temperature dependence from the single filter structure 740. It will be appreciated that such a filter path also provides a signal usable to determine and/or correct for filter temperature errors.

In one exemplary embodiment, a narrow bandpass filter structure 740 has a temperature dependence of approximately 0.001 nm/° C. The diffraction grating 710 provides a diffraction angle of approximately 8 degrees. The deflector 730 is a prism made of an optical polymer such as polyamide or the like, with an index of refraction of approximately 1.5, and a temperature coefficient of the index of refraction of approximately $-14 \times 10^{-5}$ parts/° C. According to Snell's law, for the previously given design parameters, a prism angle 731 of 35.1 degrees will produce angle of incidence for the angled filtered beam 738 relative to the filter structure 740 of approximately 8.0 degrees, similar to the angled filtered beam 734. Furthermore, the temperature coefficient of the index of refraction of the prism of deflector 730 will produce a temperature dependent change in the angle of incidence that creates a 0.001 nm/° C. center wavelength temperature dependence for the angled filtered beam 738, according to the principles discussed above in relation to EQUATION 1. This center wavelength temperature dependence for the angled filtered beam 738 is in addition to the center wavelength temperature dependence that is contributed to each of the filtered beams 732, 734 and 738 by the filter structure 740. Thus, the deflector 730 provides a deflection angle that is temperature dependent to provide a filter path having a different center wavelength temperature dependence from the other beam paths through the single filter structure 740. It will be appreciated that the measurement system 700 thus provides a signal usable to determine and/or correct for filter temperature errors.

It should be appreciated that in the previously discussed embodiment, the temperature effects of the deflector 730 can nearly or exactly compensate the temperature effects of the filter structure 740. Thus, the signal from the detector 752 can be nearly or exactly free of temperature variations due to filter temperature characteristics. Thus, in various exemplary embodiments the signals from the detectors 750 and 751 are used to correct for power variations, as previously described, and the power-corrected signal from the detector 752 provides a highly accurate wavelength measurement that is nominally free from temperature errors. However, it should be appreciated that in various other embodiments, all that is required is one signal having a unique temperature dependence relative to the other signals. Thus, in various other embodiments alternative prism angles and alternative prism materials may be used to achieve various combinations of desirable design features and tradeoffs.

More generally, it should be appreciated that the prism angle 731 can be varied, and even "reversed" in combination with various grating diffraction angles to provide a variety of alternative temperature dependencies and nominal incident angles usable according to the principles of this invention. In any case, it will be appreciated that a measuring system embodiment such as the measurement system 700 retains a very high degree of common mode error rejection by creating various transmission curves based on various beam paths through a single filter structure according to this invention, while also providing a signal that can be used to overcome various potential temperature related errors.

As previously discussed, in one embodiment of the measurement system 700, the temperature effects of the deflector 730 can nearly or exactly compensate the temperature effects of the filter structure 740. Thus, the signal from the detector 752 can be nearly or exactly free of temperature variations due to filter temperature characteristics. This principle is used in the embodiment shown in FIG. 12.

Figure 12:
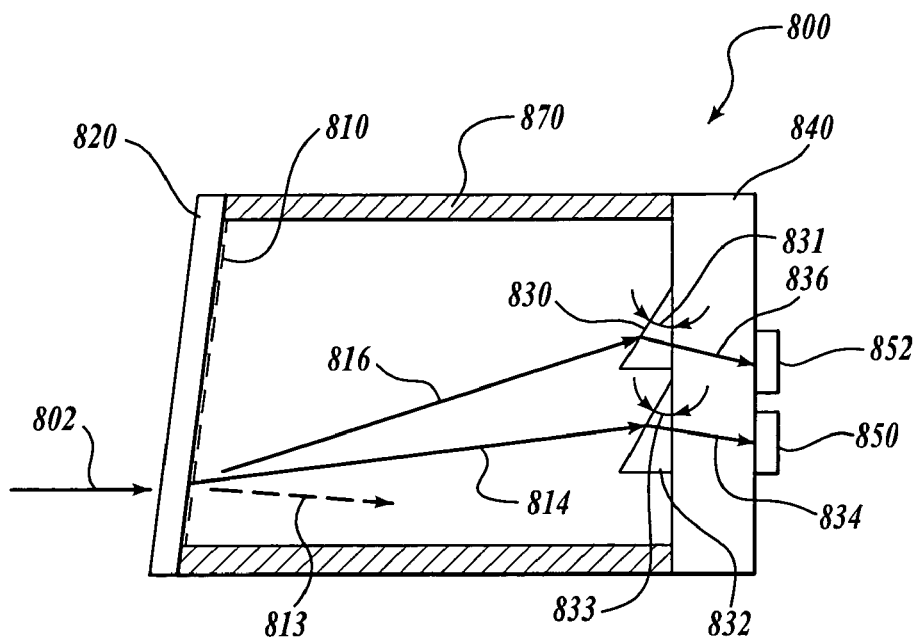
FIG. 12 is a block diagram of a fifth alternate embodiment of a measurement system utilizing a filter structure, a diffraction grating, two temperature sensitive beam deflectors and a pair of photodetectors for detecting two beams for measuring the wavelength shift of a radiation source in accordance with the present invention.

FIG. 12 is a block diagram of a fifth alternate embodiment of a measurement system according to this invention that provides two temperature compensated filter path signals from a single filter structure according to the principles of this invention. As will be described in more detail below, the measurement system 800 shown in FIG. 12 utilizes similar concepts to those described above with respect to FIGS. 4–8 and particularly those described with reference to the measurement system 700 shown in FIG. 11.

The measurement system 800 includes a diffraction grating 810 on a substrate 820, beam deflectors 830 and 832, a filter structure 840, and a photodetector array with two photodetectors 850 and 852. All of these components are joined to a spacer/housing 870. The grating pitch of the grating 810 may determined as previously described to provide desired diffraction angles between the emerging beams in a particular embodiment. An incident input beam 802 is split into an incident beam 814 and incident +/− first order beams 813 and 816 by the grating 810. In contrast to previous embodiments described herein, in the embodiment shown in FIG. 12, the grating 810 is also inclined relative to the incident beam 802 such that each of the resulting beams 813, 814 and 816, including the zero order beam 814, all emerge at desired angles. A proper inclination of the grating 810 to provide the desired angles for the beams 813, 814 and 816 can be determined according to well known grating equations.

The first order beam 813 is directed away from the detectors 850 and 852 and is trapped by an optical baffle (not shown) in various exemplary embodiments. The first order beam 816 passes to the deflector 830, which deflects the beam through a deflection angle to provide a respective desired angle of incidence for the angled filtered beam 838 relative to the filter structure 840. Furthermore, the deflector 830 provides a deflection angle that is temperature dependent, as described previously, and as is further described in specific detail below. The incident beam 814 passes to the deflector 832, which deflects the beam through a deflection angle to provide a respective desired angle of incidence for the angled filtered beam 834 relative to the filter structure 840. Furthermore, the deflector 832 provides a deflection angle that is temperature dependent, as previously described. In the exemplary embodiment shown in FIG. 12, the deflectors 830 and 832 are prisms having respective prism angles 831 and 833. However, in various other embodiments the deflectors 830 and 832 may be any other now known or later developed beam deflecting element, including but not limited to passive optical elements and active beam steering elements such as MEMS beam steering devices and the like, which can provide a deflection angle that is temperature dependent according to the principles of this invention. The angled filtered beams 834 and 838 pass through the filter structure 840 to the detectors 850 and 852, respectively.

It should be appreciated that in the measuring system 800 shown in FIG. 12, the configuration of the beams 813, 814 and 816, and the configuration of the temperature dependent deflectors 830 and 832 are chosen such that the temperature dependency of the deflectors 830 and 832 can nearly or exactly compensate the temperature effects of the filter structure 740 for each respective beam path. Thus, the signals from the detectors 750 and 752 can be nearly or exactly free of temperature variations due to filter temperature characteristics.

In one exemplary embodiment, a narrow bandpass filter structure 840 has a temperature dependence of approximately 0.001 nm/° C. The diffraction grating 810 has a grating pitch and orientation such that the beam 814 is rotated to an angle of 4 degrees and the beam 816 is rotated to an angle of 12 degrees relative to the surface normal of the filter structure 840. The deflectors 830 and 832 are prisms having the same material and optical properties as the previously described prism 730, discussed with reference to FIG. 11. According to Snell's law, for the previously given design parameters, a prism angle 831 of 37.4 degrees will produce angle of incidence for the angled filtered beam 838 relative to the filter structure 840 of approximately −7.0 degrees and a prism angle 833 of 33.0 degrees will produce angle of incidence for the angled filtered beam 834 relative to the filter structure 840 of approximately −9.34 degrees.

Furthermore, the temperature coefficient of the index of refraction of each of the prisms of the deflectors 830 and 832 will produce a temperature dependent change in the respective angles of incidence that creates a 0.001 nm/° C. center wavelength temperature dependence for the angled filtered beams 838 and 834 respectively, according to the principles discussed above in relation to EQUATION 1. This center wavelength temperature dependence for the angled filtered beams 838 and 834 is in addition to the center wavelength temperature dependence that is contributed to each of the angled filtered beams 834 and 838 by the filter structure 840. Thus, the deflectors 830 and 832 provide respective deflection angles that are temperature dependent to provide respective filter paths that are each nearly or exactly compensated for the temperature effects of the filter structure 840. Thus, the signals from the detectors 750 and 752 can be nearly or exactly free of temperature variations due to filter temperature characteristics. Thus, in various exemplary embodiments the signals from the detectors 750 and 752 are used to correct for power variations, as previously described, and the power-corrected signal from the detectors 750 and 752 provides a highly accurate wavelength measurement that is nominally free from temperature errors.

It will be appreciated that the previous description emphasizes embodiments that direct the beams through the same filter structure in order to most conveniently and reliably provide at least two wavelength measuring signals arising from beam paths having differing angles of incidence through substantially identical filters according to the principles of this invention. In such embodiments, the substantially identical filters are more likely to be completely identical because they are portions of a single filter of uniform construction and alignment. However, it should be appreciated that, more generally, in various other exemplary embodiments, beams may be directed at differing angles of incidence through substantially identical filter structures that are more or less physically separate, to provide wavelength measuring signals according to the principles of this invention, and that many of the advantages according to this invention will be retained. It will be appreciated that, as the physical separation between the substantially identical filters is diminished and eliminated, the full advantages according to this invention are correspondingly attained. Thus, while the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A radiation measurement device for determining a wavelength-related characteristic of radiation from a radiation source, the radiation measurement device comprising:

a first beam path at a first angle of incidence through a wavelength sensitive filter, the first beam path receiving a first beam of input radiation and outputting a first filtered beam;

a second beam path at a second angle of incidence through a wavelength sensitive filter, the second beam path receiving a second beam of input radiation and outputting a second filtered beam, the second angle of incidence being different from the first angle of incidence;

a first detection channel comprising a radiation detector positioned to receive the first filtered beam and output a corresponding first detector signal S1;

a second detection channel comprising a radiation detector positioned to receive the second filtered beam and output a corresponding second detector signal S2; and a signal processing circuit which inputs the first and second detector signals and determines at least one signal ratio comprising at least the first and second detector signal values, wherein:

the first beam path at a first angle of incidence through a wavelength sensitive filter and the second beam path at a second angle of incidence through a wavelength sensitive filter are through substantially identical wavelength sensitive filters;

the device is operable over a nominal operating range of input radiation wavelengths: and the device is configured to provide a set of operating characteristics selected from a group consisting of:

a) a set of operating characteristics wherein the transmission of the wavelength sensitive filter of one of the first beam path and the second beam path decreases with decreasing input radiation wavelength over the nominal operating range, the transmission of the wavelength sensitive filter of the other of the first beam path and the second beam path increases with decreasing input radiation wavelength over the nominal operating range, and the at least one signal ratio comprising at least the first and second detector signal values comprises at least one of [(S2−S1)/(S2+S1)], and [(S1−S2)/(S1+S2)], b) a set of operating characteristics wherein the transmission of the wavelength sensitive filter of the first beam path increases with increasing input radiation wavelength over the nominal operating range, the transmission of the wavelength sensitive filter of the second beam path increases with increasing input radiation wavelength over the nominal operating range, the first and second detector signals are nominally different over the nominal operating range, and the at least one signal ratio comprising at least the first and second detector signal values comprises at least one of [(S2+S1)/(S2−S1)], and [(S2+S1)/(S1−S2)], and c) a set of operating characteristics wherein the transmission of the wavelength sensitive filter of the first beam path decreases with decreasing input radiation wavelength over the nominal operating range, the transmission of the wavelength sensitive filter of the second beam path decreases with decreasing input radiation wavelength over the nominal operating range, the first and second detector signals are nominally different over the nominal operating range, and the at least one signal ratio comprising at least the first and second detector signal values comprises at least one of [(S2+S1)/(S2−S1)], and [(S2+S1)/(S1−S2)].

2. The measurement device of claim 1, wherein the first beam path is nominally normal to the surface of the wavelength sensitive filter.

3. The measurement device of claim 1, wherein the substantially identical wavelength sensitive filters comprise bandpass filters.

4. The measurement device of claim 3, wherein the substantially identical wavelength sensitive filters comprise portions of a single filter.

5. The measurement device of claim 1, wherein the first detection channel comprises a first radiation detector and the second detection channel comprises a second radiation detector and the first and second beams of input radiation comprise separate portions of a single incident diverging beam of the radiation from the radiation source.

6. The measurement device of claim 1, further comprising a first beam deflection element positioned to receive input radiation and provide at least one of the first and second beams of input radiation along a respective beam path at a respective angle of incidence.

7. The measurement device of claim 6, wherein the first beam deflection element comprises a first grating, the first grating is a blazed grating, the first beam of input radiation is a transmitted zero order beam provided by the first grating, and the second beam of input radiation is a diffracted first order beam provided by the first grating.

8. The measurement device of claim 6, wherein the first detection channel comprises a first radiation detector and the second detection channel comprises a second radiation detector.

9. The measurement device of claim 6, further comprising a second beam deflection element positioned to receive at least the second filtered beam and deflect at least a portion of the second filtered beam to be received by the second detection channel.

10. The measurement device of claim 9, wherein the second beam deflection element comprises a second grating.

11. The measurement device of claim 9, wherein the radiation detector of the first detection channel and the radiation detector of the second detection channel comprise the same radiation detector, and the measurement device further comprises a shutter located between the second beam deflection element and the radiation detector, wherein the shutter is able to switch between passing the first filtered beam to provide the first detection channel and passing the second filtered beam to provide the second detection channel.

12. The measurement device of claim 1, further comprising at least one temperature sensing element positioned proximate to at least one of the substantially identical wavelength sensitive filters, the at least one temperature sensing element outputting a temperature signal indicative of the temperature of the substantially identical wavelength sensitive filters, wherein the signal processing circuit inputs the temperature signal and determines the at least one signal ratio as a temperature-compensated signal ratio.

13. The measurement device of claim 1, further comprising;

a third beam path at a third angle of incidence through a wavelength sensitive filter, the third beam path receiving a third beam of input radiation and outputting a third filtered beam;

a third detection channel comprising a radiation detector positioned to receive the third filtered beam and output a corresponding third detector signal; and a temperature–Sensitive beam deflector positioned to receive input radiation and output the third beam of input radiation along the third beam path at the third angle of incidence;

wherein:

the first beam path at a first angle of incidence through a wavelength sensitive filter and the second beam path at a second angle of incidence through a wavelength sensitive filter and the third beam path at a third angle of incidence through a wavelength sensitive filter are through substantially identical wavelength sensitive filters; and the third angle of incidence is adjusted based on the temperature of the temperature-sensitive beam deflector, such that potential changes in the third detector signal due to temperature-induced changes in the filter characteristics of the wavelength sensitive filter of the third beam path are at least partially compensated by the adjustment of the third angle of incidence.

14. The measurement device of claim 1, further comprising at least one source input optical fiber having a first end for receiving radiation from the radiation source, and a second end positioned to deliver the source radiation at a fixed alignment relative to at least one wavelength sensitive filter.

15. A radiation measurement device for determining a wavelength-related characteristic of radiation from a radiation source, the radiation measurement device comprising:
  a first beam path at a first angle of incidence through a wavelength sensitive filter, the first beam path receiving a first beam of input radiation and outputting a first filtered beam;
  a second beam path at a second angle of incidence through a wavelength sensitive filter, the second beam path receiving a second beam of input radiation and outputting a second filtered beam, the second angle of incidence being different from the first angle of incidence;
  a first detection channel comprising a radiation detector positioned to receive the first filtered beam and output a corresponding first detector signal;
  a second detection channel comprising a radiation detector positioned to receive the second filtered beam and output a corresponding second detector signal;
  a first temperature-sensitive beam deflector positioned to receive input radiation and output the first beam of input radiation along the first beam path at the first angle of incidence; and
  a second temperature-sensitive beam deflector positioned to receive input radiation and output the second beam of input radiation along the second beam path at the second angle of incidence;
  wherein:
  the first beam path at a first angle of incidence through a wavelength sensitive filter and the second beam path at a second angle of incidence through a wavelength sensitive filter are through substantially identical wavelength sensitive filters;
  the first angle of incidence is adjusted based on the temperature of the first temperature-sensitive beam deflector, such that potential changes in the first detector signal due to temperature-induced changes in the filter characteristics of the wavelength sensitive filter of the first beam path are at least partially compensated by the adjustment of the first angle of incidence; and
  the second angle of incidence is adjusted based on the temperature of the first temperature-Sensitive beam deflector, such that potential changes in the second detector signal due to temperature-induced changes in the filter characteristics of the wavelength sensitive filter of the second beam path are at least partially compensated by the adjustment of the second angle of incidence.

16. A radiation measurement device for determining a wavelength-related characteristic of radiation from a radiation source, the radiation measurement device comprising:
  a first beam path at a first angle of incidence through a wavelength sensitive filter, the first beam path receiving a first beam of input radiation and outputting a first filtered beam;
  a second beam path at a second angle of incidence through a wavelength sensitive filter, the second beam path receiving a second beam of input radiation and outputting a second filtered beam, the second angle of incidence being different from the first angle of incidence;
  a first detection channel comprising a radiation detector positioned to receive the first filtered beam and output a corresponding first detector signal S1;
  a second detection channel comprising a radiation detector positioned to receive the second filtered beam and output a corresponding second detector signal S2;
  a third beam path at a third angle of incidence through a wavelength sensitive filter, the third beam path receiving a third beam of input radiation and outputting a third filtered beam;
  a fourth beam path at a fourth angle of incidence through a wavelength sensitive filter, the fourth beam path receiving a fourth beam of input radiation and outputting a fourth filtered beam;
  a third detection channel comprising a radiation detector positioned to receive the third filtered beam and output a corresponding third detector signal;
  a fourth detection channel comprising a radiation detector positioned to receive the fourth filtered beam and output a corresponding fourth detector signal; and
  a signal processing circuit which inputs the first, second, third and fourth detector signals and determines at least one signal ratio comprising at least the first and second detector signal values,
  wherein:
  the first beam path at a first angle of incidence through a wavelength sensitive filter and the second beam path at a second angle of incidence through a wavelength sensitive filter are through substantially identical wavelength sensitive filters;
  the third beam path at a third angle of incidence through a wavelength sensitive filter and the fourth beam path at a fourth angle of incidence through a wavelength sensitive filter are through substantially identical wavelength sensitive filters;
  the substantially identical wavelength sensitive filters of the first and second beam paths have a different temperature sensitivity than the substantially identical wavelength sensitive filters of the third and fourth beam paths; and
  the signal processing circuit determines the at least one signal ratio as a temperature-compensated signal ratio.

17. The measurement device of claim 16, further comprising a first grating and a second grating, wherein:
  the first grating is positioned to receive input radiation and provide at least a first preliminary beam of input radiation to the second grating at the first angle of incidence and a second preliminary beam of input radiation to the second grating at the fourth angle of incidence; and
  the second grating is positioned to receive the first preliminary beam of input radiation and provide the first beam of input radiation along the first beam path at the first angle of incidence and the second beam of input radiation along the second beam path at the second angle of incidence, and to receive the second preliminary beam of input radiation and provide the fourth beam of input radiation along the fourth beam path at the fourth angle of incidence and the third beam of input radiation along the third beam path at the third angle of incidence.

18. The measurement device of claim 16, wherein the substantially identical wavelength sensitive filters of the first and second beam paths and the substantially identical wavelength sensitive filters of the third and fourth beam paths all have substantially identical wavelength-dependent transmission characteristics.

19. A method of determining a wavelength-related characteristic of radiation from a radiation source, the method comprising:
receiving a first beam of input radiation from the radiation source along a first beam path at a first angle of incidence through a wavelength sensitive filter;
outputting a first filtered beam from the first beam path;
receiving a second beam of input radiation from the radiation source along a second beam path at a second angle of incidence through a wavelength sensitive filter, the second angle of incidence being different from the first angle of incidence;
outputting a second filtered beam from the second beam path;
receiving the first filtered beam with a radiation detector positioned along a first detection channel and outputting a first detector channel signal;
receiving the second filtered beam with a radiation detector positioned along a second detection channel and outputting a second detector channel signal; and
processing the first and second detector channel signals to determine at least one signal ratio comprising at least the first and second detector channel signal values,
wherein:
the first beam path at a first angle of incidence through a wavelength sensitive filter and the second beam path at a second angle of incidence through a wavelength sensitive filter are through substantially identical wavelength sensitive filters;
the device is operable over a nominal operating range of input radiation wavelengths;
the device is configured to provide a set of operating characteristics selected from a group consisting of:
a) a set of operating characteristics wherein the transmission of the wavelength sensitive filter of one of the first beam path and the second beam path decreases with decreasing input radiation wavelength over the nominal operating range, the transmission of the wavelength sensitive filter of the other of the first beam path and the second beam path increases with decreasing input radiation wavelength over the nominal operating range.
b) a set of operating characteristics wherein the transmission of the wavelength sensitive filter of the first beam path increases with increasing input radiation wavelength over the nominal operating range, the transmission of the wavelength sensitive filter of the second beam path increases with increasing input radiation wavelength over the nominal operating range, the first and second detector signals are nominally different over the nominal operating range, and
c) a set of operating characteristics wherein the transmission of the wavelength sensitive filter of the first beam path decreases with decreasing input radiation wavelength over the nominal operating range, the transmission of the wavelength sensitive filter of the second beam path decreases with decreasing input radiation wavelength over the nominal operating range, the first and second detector signals are nominally different over the nominal operating range, and
if the device is configured according to a), then the at least one signal ratio comprising at least the first and second detector signal values comprises at least one of $[(S2-S1)/(S2+S1)]$, and $[(S1-S2)/(S1+S2)]$,
if the device is configured according to b), then the at least one signal ratio comprising at least the first and second detector signal values comprises at least one of $[(S2+S1)/(S2-S1)]$, and $[(S2+S1)/(S1-S1)]$, and
if the device is configured according to c), then the at least one signal ratio comprising at least the first and second detector signal values comprises at least one of $[(S2+S1)/(S2-S1)]$, and $[(S2+S1)/(S1-S2)]$.

20. The method of claim 19, wherein the substantially identical wavelength sensitive filters comprise portions of a single filter.

21. The method of claim 19, further comprising: receiving a third beam of input radiation from the radiation source along a third beam path at a third angle of incidence through a wavelength sensitive filter;
outputting a third filtered beam from the third beam path;
receiving a fourth beam of input radiation from the radiation source along a fourth beam path at a fourth angle of incidence through a wavelength sensitive filter, the fourth angle of incidence being different from the third angle of incidence;
outputting a fourth filtered beam from the fourth beam path;
receiving the third filtered beam with a radiation detector positioned along a third detection channel and outputting a third detector channel signal; and
receiving the fourth filtered beam with a radiation detector positioned along a fourth detection channel and outputting a fourth detector channel signal;
wherein:
the third beam path at a third angle of incidence through a wavelength sensitive filter and the fourth beam path at a fourth angle of incidence through a wavelength sensitive filter are through substantially identical wavelength sensitive filters;
the substantially identical wavelength sensitive filters of the first and second beam paths have a different temperature sensitivity than the substantially identical wavelength sensitive filters of the third and fourth beam paths; and
the processing step further comprises Processing the third and fourth detector channel signals and determining the at least one signal ratio as a temperature-compensated signal ratio.

22. The method of claim 21, further comprising determining at least one of a radiation wavelength and a radiation frequency of the radiation from the radiation source in a manner that is substantially insensitive to power variations in the radiation from the radiation source and temperature variations of the wavelength sensitive filters.

* * * * *

UNITED STATES PATENT AND TRADEMARK OFFICE
CERTIFICATE OF CORRECTION

PATENT NO. : 7,088,441 B2  Page 1 of 1
APPLICATION NO. : 10/251449
DATED : August 8, 2006
INVENTOR(S) : M. Nahum et al.

It is certified that error appears in the above-identified patent and that said Letters Patent is hereby corrected as shown below:

| COLUMN | LINE | ERROR |
|---|---|---|
| Please insert, Item (56) Pg. 1, col. 2 | Refs. Cited (Foreign Pats., Items 1-2) | "EP 0 818 859 A1 1/1998 EP 0 911 621 A2 4/1999" should read: --EP 0 818 859 A1 1/1998 EP 0 911 621 A2 4/1999-- |
| 26 (Claim 13, | 51 line 10) | "temperature-Sensitive" should read --temperature-sensitive-- |
| 27 (Claim 15, | 49 line 41) | "temperature-Sensitive" should read --temperature-sensitive-- |
| 30 (Claim 19, | 10 line 69) | "(S1-S1)" should read --(S1-S2)-- |
| 30 (Claim 21, | 18 line 1) | following "comprising:" insert a paragraph break |

Signed and Sealed this

Twelfth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,088,441 B2  Page 1 of 1
APPLICATION NO. : 10/251449
DATED : August 8, 2006
INVENTOR(S) : M. Nahum et al.

It is certified that error appears in the above-identified patent and that said Letters Patent is hereby corrected as shown below:

| COLUMN | LINE | ERROR |
|---|---|---|
| 11 | 23 | "$\lambda_{act} = f[(S2 - S1)/(S2 + 1]$" should read "$\lambda_{act} = f[(S2 - S1)/(S2 + 1)]$" |

Signed and Sealed this

Twenty-seventh Day of April, 2010

David J. Kappos
*Director of the United States Patent and Trademark Office*